US012730392B2

(12) United States Patent
Agata et al.

(10) Patent No.: US 12,730,392 B2
(45) Date of Patent: Sep. 8, 2026

(54) IMAGE FORMING APPARATUS CONTROLLING PRE-EXPOSURE OF PHOTOSENSITIVE DRUM

(71) Applicant: CANON KABUSHIKI KAISHA, Tokyo (JP)

(72) Inventors: Shinichi Agata, Shizuoka (JP); Kazunori Hashimoto, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/979,913

(22) Filed: Dec. 13, 2024

(65) Prior Publication Data

US 2025/0199436 A1 Jun. 19, 2025

(30) Foreign Application Priority Data

Dec. 14, 2023 (JP) ................................ 2023-211519

(51) Int. Cl.

| | |
|---|---|
| ***G03G 15/04*** | (2006.01) |
| ***G03G 15/00*** | (2006.01) |
| ***G03G 15/043*** | (2006.01) |
| ***G03G 21/00*** | (2006.01) |
| ***G03G 21/08*** | (2006.01) |

(52) U.S. Cl.

CPC ....... *G03G 15/043* (2013.01); *G03G 15/5033* (2013.01); *G03G 21/0094* (2013.01); *G03G 21/08* (2013.01); *G03G 2215/0478* (2013.01)

(58) Field of Classification Search

CPC ............ G03G 15/043; G03G 15/5033; G03G 21/0094; G03G 21/06; G03G 21/08; G03G 2215/00071; G03G 2215/0478

USPC ............................................ 399/43, 51, 128

See application file for complete search history.

(56) References Cited

U.S. PATENT DOCUMENTS 4,375,328 A * 3/1983 Tsuchiya ............. G03G 15/043 399/43
4,380,386 A * 4/1983 Yasuda ................. G03G 21/00 399/128

(Continued)

FOREIGN PATENT DOCUMENTS

JP 2001-042661 A 2/2001
JP 2004-233720 A 8/2004

(Continued)

*Primary Examiner* — Robert B Beatty
(74) *Attorney, Agent, or Firm* — Venable LLP

(57) ABSTRACT

An image forming apparatus includes an image bearing member, an exposure portion, a developing portion including a developer carrying member, a transfer portion, a development separation portion, a transfer separation portion, a storing portion, and a controller. Before a present image forming operation, the controller controls the transfer separation portion to put the image bearing member and the transfer portion in a separation state and controls the development separation portion to put the image bearing member and the developer carrying member in a separation state, and then the controller carries out control to determine whether or not pre-exposure for exposing the image bearing member to light by the exposure portion is executed, depending on a standing time from an end of a last image forming operation to a start of the present image forming operation and on information stored in the storing portion.

2 Claims, 12 Drawing Sheets

(56) References Cited

U.S. PATENT DOCUMENTS

| | | | | |
|---|---|---|---|---|
| 4,474,455 | A * | 10/1984 | Hirakura | G03G 21/00 399/128 |
| 7,817,954 | B2 | 10/2010 | Yano et al. | |
| 2007/0048011 | A1 * | 3/2007 | Okubo | G03G 15/1605 399/128 |
| 2009/0169227 | A1 * | 7/2009 | Kanai | G03G 21/08 399/128 |
| 2010/0239280 | A1 * | 9/2010 | Inoue | G03G 21/08 399/186 |
| 2012/0300009 | A1 * | 11/2012 | Toyoizumi | G03G 15/043 347/118 |
| 2017/0031260 | A1 * | 2/2017 | Ikada | G03G 15/1675 |
| 2017/0108793 | A1 * | 4/2017 | Kishi | G03G 21/08 |
| 2019/0079429 | A1 * | 3/2019 | Kawaguchi | G03G 15/80 |
| 2020/0393778 | A1 * | 12/2020 | Kurokawa | G03G 15/0266 |

FOREIGN PATENT DOCUMENTS

| | | | |
|---|---|---|---|
| JP | 2009-092960 | A | 4/2009 |
| JP | 2019-053181 | A | 4/2019 |

* cited by examiner

IMAGE FORMING APPARATUS CONTROLLING PRE-EXPOSURE OF PHOTOSENSITIVE DRUM

FIELD OF THE INVENTION AND RELATED ART

The present invention relates to an image forming apparatus. The image forming apparatus forms an image on a recording material (recording medium) with use of an electrophotographic image forming type system. As an example of the image forming apparatus, a copying machine, a printer (laser beam printer, LED printer, or the like), a facsimile machine, a word processor, a multi-function machine (multi-function printer), and the like are encompassed.

The image forming apparatus such as the copying machine, the laser beam printer, or the like with use of the electrophotographic type system forms an electrostatic latent image by irradiating a photosensitive member surface (onto an image bearing member) electrically charged uniformly, with laser light corresponding to image data. Further, the image forming apparatus supplies a developer (hereinafter, referred to as "toner") from a developing device to the electrostatic latent image, so that the electrostatic latent image is visualized as a toner image on the photosensitive member surface. This toner image is transferred from the photosensitive member surface onto a toner image receiving material such as a recording sheet by a transfer device, and is fixed on the toner image receiving material by a fixing device, so that a recording image is formed. The photosensitive member surface after the toner image receiving material is separated is cleaned by scraping off transfer residual toner therefrom by a cleaning device, and then is repetitively subjected to image formation.

Incidentally, in the image forming apparatus of the electrophotographic type, various (electric) charges are generated on the photosensitive member by transmission and reception of the charges due to friction with members contacting the photosensitive member surface or electric discharge, and by generation of the charges inside the photosensitive member by the laser light. As shown in FIG. 10, the photosensitive member has a structure such that a charge generation layer in which a photo-carrier (positive in FIG. 10) is generated when irradiation with light and a charge transport layer in which the photo-carrier moves are superposed on each other. As shown in parts (a) and (b) of FIG. 1, a potential of a portion exposed to light becomes lower than a charging potential (Vd), so that an electrostatic latent image is formed. However, when exposure (to light) is strong, the photo-carrier remains at the portion exposed to light (parts (c) and (d) of FIG. 11). A remaining photo-carrier hinders movement of a new photo-carrier toward the charge transport layer (parts (e) and (f) of FIG. 11), so that an image which is called a negative ghost generates in some instances as shown in part (a) of FIG. 12.

In order to prevent the negative ghost, it is possible to cite a method in which a pre-exposure means using an LED or the like is provided on a side downstream of a transfer portion and upstream of a charging portion with respect to a rotational direction of the photosensitive member and in which the photosensitive member surface before the charging is exposed to light in a whole region thereof with respect to a longitudinal direction of the photosensitive member. According to this method, even when the photo-carrier exists in the charge transport layer or the charge generation layer the photosensitive member surface is exposed to light in the whole region, and therefore, the photo-carrier uniformly exists and thus does not appear as a ghost image. However, in this method, there is a need to provide the pre-exposure means separately from an exposure means in the image forming apparatus, and therefore, there arises problems such as increases in size and cost of the image forming apparatus itself and the like problem. For that reason, for example, as disclosed in Japanese Laid-Open Patent Application No. 2019-053181, it is possible to cite a method in which the photosensitive member is exposed to light before image formation by using the exposure means instead of the pre-exposure means. This method is a method in which the photosensitive member surface is exposed to light before the image formation by using the exposure means for performing latent image formation during normal image formation.

SUMMARY OF THE INVENTION

In order to solve the above-described problems, according to an aspect of the present invention, there is provided an image forming apparatus comprising: an image bearing member; exposure means configured to form an electrostatic latent image on the image bearing member by exposing the image bearing member to light; developing means including a developer carrying member for carrying a developer and configured to develop the electrostatic latent image by supplying the developer by the developer carrying member and to form a developer image; transfer means configured to transfer the developer image; development separation means configured to enable a contact state in which the image bearing member and the developer carrying member are in contact with each other and a separation state in which the image bearing member and the developer carrying member are in separation from each other; transfer separation means configured to enable a contact state in which the image bearing member and the transfer means are in contact with each other and a separation state in which the image bearing member and the transfer means are in separation from each other; storing means configured to store information on a thickness of a charge generation layer of the image bearing member; and a controller configured to control the exposure means the development separation means, and the transfer separation means; wherein before a present image forming operation is performed, the controller controls the transfer separation means so as to put the image bearing member and the transfer means in the separation state and controls the development separation means so as to put the image bearing member and the developer carrying member in the separation state, and then the controller carries out control so as to determine whether or not pre-exposure for exposing the image bearing member to light by the exposure means is executed, depending on a standing time from an end of a last image forming operation to a start of the present image forming operation and on the information stored in the storing means.

Further features of the present invention will become apparent from the following description of exemplary embodiments with reference to the attached drawings.

BRIEF DESCRIPTION OF THE DRAWINGS

Parts (a) and (b) of FIG. 1 are schematic sectional views of an image forming apparatus and a process cartridge, respectively.

Figure 8:
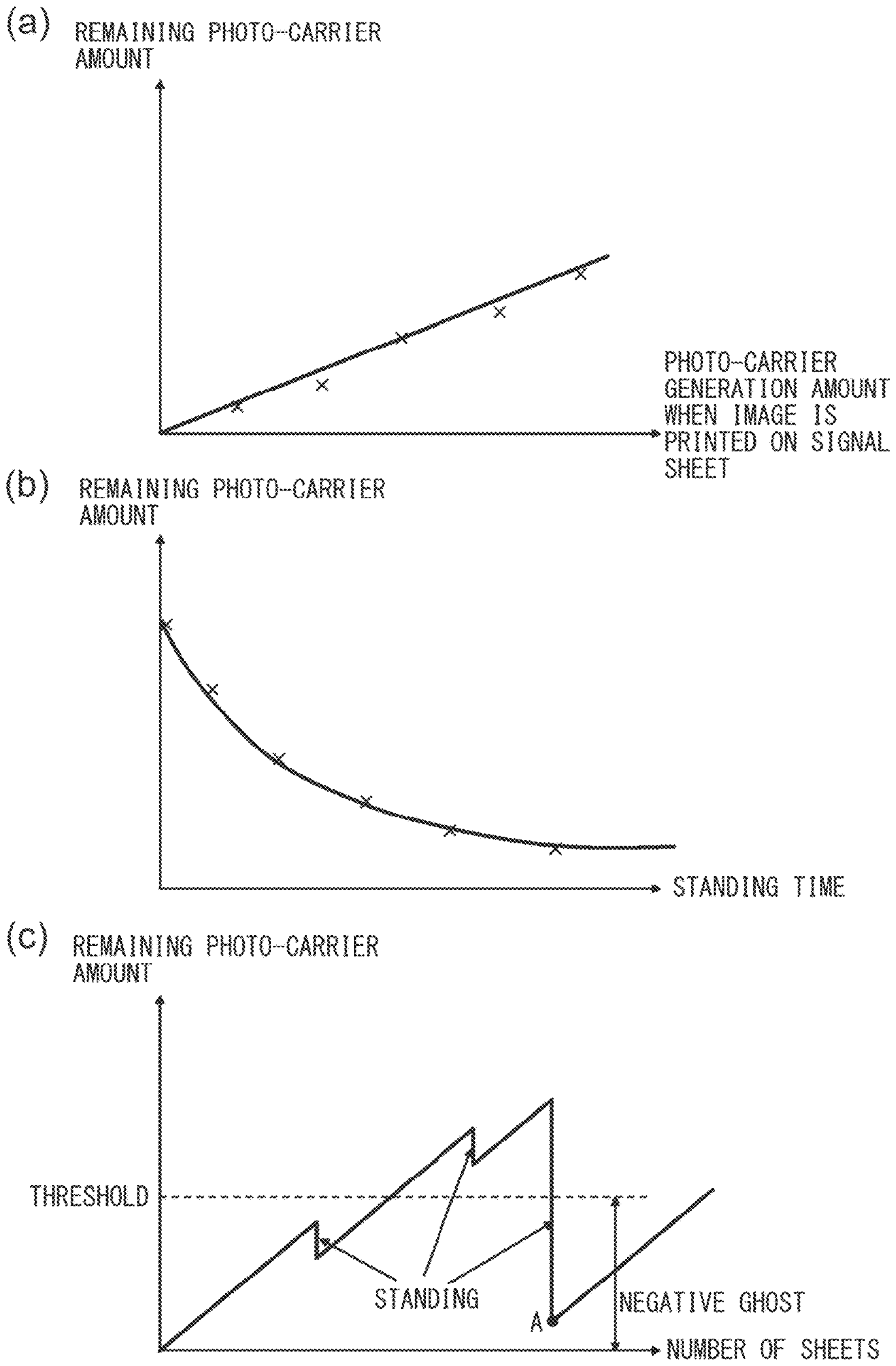

Parts (a), (b) and (c) of FIG. 8 are graphs showing a relationship between a photo-carrier generation amount and a remaining portion amount, a relationship between a standing time and the remaining photo-carrier amount, and a relationship between a number of printed sheets and the remaining photo-carrier amount, respectively.

Figure 9:
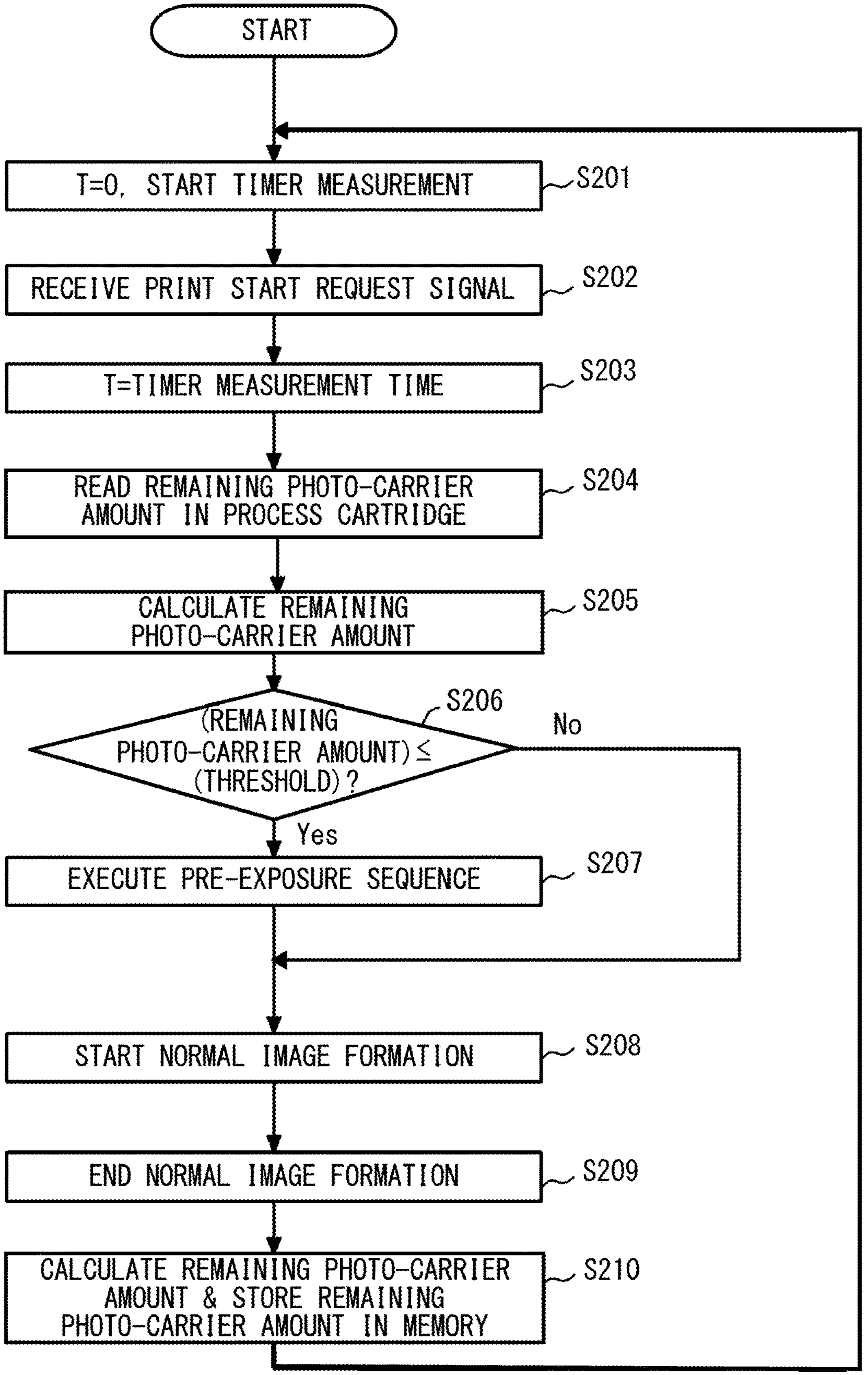

FIG. 9 is a flowchart showing discrimination processing of execution propriety of the pre-exposure.

Figure 10:
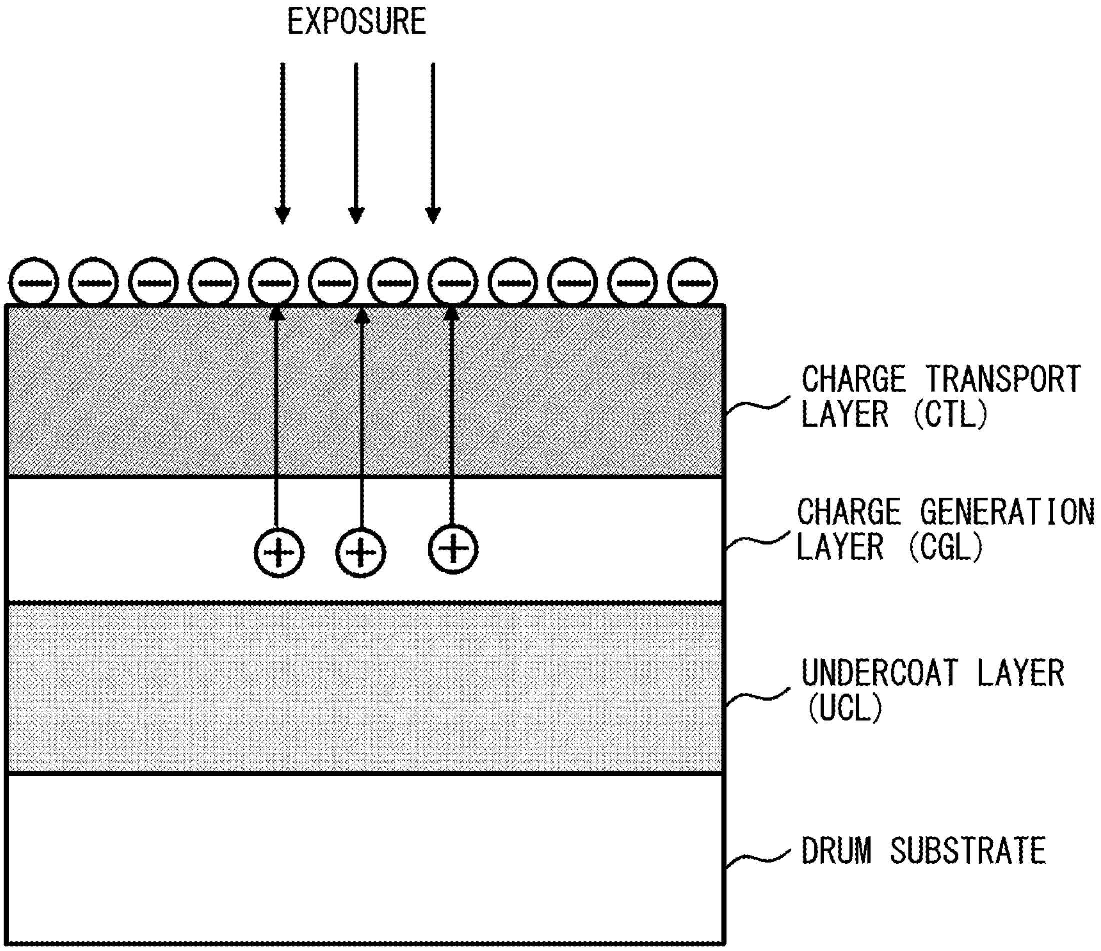
Fig. 10 CONVENTIONAL ART

FIG. 10 is a schematic sectional view illustrating a layer structure of a photosensitive member in a conventional example.

Figure 11:
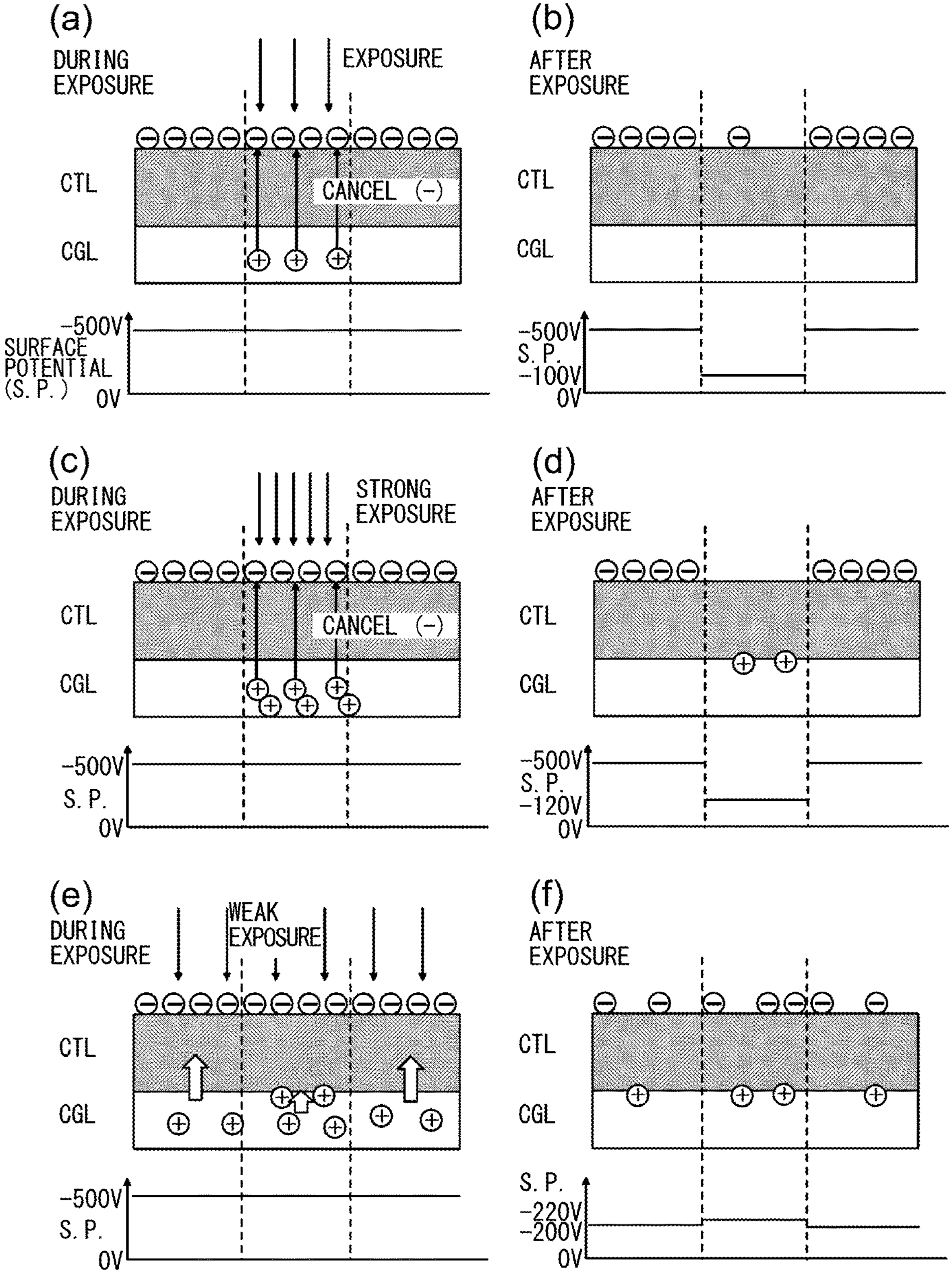
Fig. 11 CONVENTIONAL ART

Parts (a) to (f) of FIG. 11 are schematic illustrations for explaining a negative ghost in the conventional example.

Figure 12:
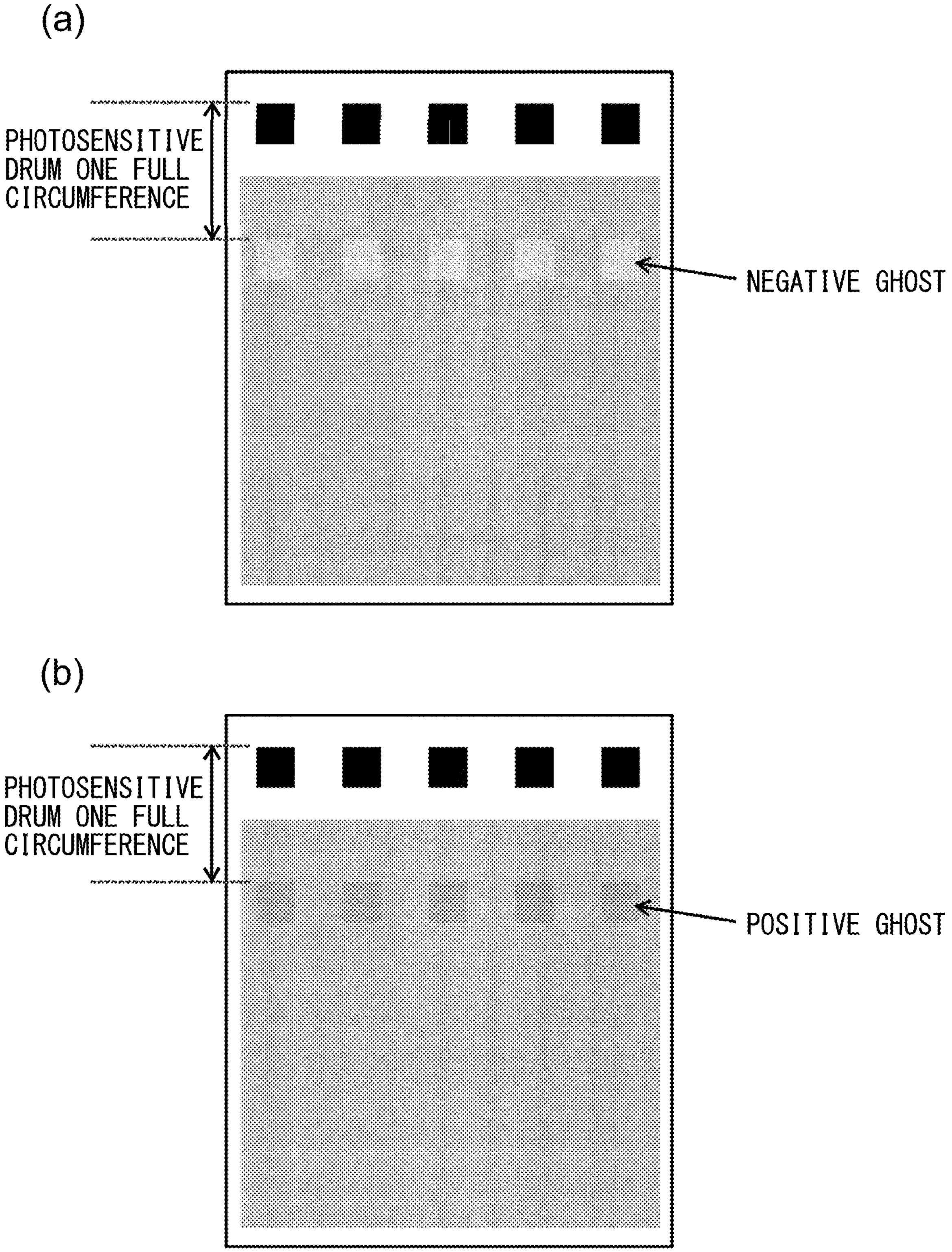
Fig. 12 CONVENTIONAL ART

Parts (a) and (b) of FIG. 12 are schematic views of print images during generations of the negative ghost and a positive ghost, respectively, in the conventional example.

DESCRIPTION OF THE EMBODIMENTS

In the following, exemplary embodiments of the present invention will be described with reference to the drawings. Incidentally, the following embodiments are exemplification, and the present invention is not limited to contents of the following embodiments. Further, in the respective drawings, constituent elements unnecessary to illustrate the respective embodiments will be omitted from the drawings.

<Negative Ghost>

Here, generation of a negative ghost will be specifically described. FIG. 10 is a schematic sectional view illustrating a layer structure of a photosensitive member. As shown in FIG. 10, the photosensitive member has a structure in which a drum substrate, an undercoat layer (UCL), a charge generation layer (CGL), and a charge transport layer (CTL) are superposed with each other from a center portion toward a circumferential portion (surface). The charge generation layer generates a photo-carrier (positive electric charge in FIG. 10) when it receives light. The charge transport layer is a layer in which the photo-carrier moves.

Parts (a) to (f) of FIG. 11 show the charge generation layer and the charge transport layer in an upper portion and a surface potential (V) of the photosensitive member in a lower portion, and shows a state after exposure. As shown in parts (a) and (b) of FIG. 11, a surface of the photosensitive member is electrically charged by a charging member, and thereafter, the photo-carrier attaches to the charge generation layer at a portion exposed to light by an exposure device. Here, a potential after the charging is referred to as a charging potential Vd. The charge of the photo-carrier attached to the charge generation layer and a negative (electric) charge accumulated on the photosensitive member surface cancel each other. By this, the potential of the portion exposed to light lowers in absolute value relative to the charging potential, so that an electrostatic latent image is formed. Here, a potential lowered in absolute value by being exposed to light is referred to as exposure potential Vl.

However, as shown in parts (c) and (d) of FIG. 11, when the exposure is strong, an amount of the photo-carrier attached to the charge generation layer becomes large, and therefore, the photo-carrier remains at the portion exposed to light without being bonded to the negative charge on the photosensitive drum surface in some instances. Hereinafter, the photo-carrier remaining on the charge generation layer after the exposure is referred to as a remaining photo-carrier. In such a case, as shown in part (e) of FIG. 11, there is a liability that the remaining photo-carrier hinders movement of a new photo-carrier, generated by subsequent exposure, toward the charge transport layer. Then, as shown in part (f) of FIG. 11, only a portion where the photo-carrier was present does not lower in absolute value of the potential compared with a normal potential, so that an image which is called the negative ghost generates in some instances as shown in part (a) of FIG. 12. Part (a) of FIG. 12 shows a state in which in an image, the negative ghost is generated in a position corresponding to one full circumference of the photosensitive member by the influence of the remaining photo-carrier before one full circumference. As shown in part (a) of FIG. 12, the negative ghost is a phenomenon such that the image formed on the photosensitive drum 1 before the one full circumference is visualized by becoming thin (white).

In order to prevent the negative ghost, it is possible to cite a method in which a pre-exposure means using an LED (Light Emitting Diode) or the like is provided on a side downstream of a transfer portion and upstream of a charging portion with respect to a rotational direction of the photosensitive member in some cases. Pre-exposure means exposing the photosensitive member surface before charging with light in a whole region thereof with respect to a longitudinal direction of the photosensitive member. According to this method, even when the photo-carrier exists in the charge transport layer or the charge generation layer when the photosensitive member surface is exposed to light in the whole region by the pre-exposure means, the photo-carrier in the charge generation layer uniformly exists and thus does not appear as a ghost image. However, in this method, there is a need to provide the pre-exposure means separately from an exposure means in the image forming apparatus, and therefore, there arises problems such as increases in size and cost of the image forming apparatus itself and the like problem. For that reason, for example, it is possible to cite a method in which the photosensitive member is exposed to light before image formation by using the exposure means instead of the pre-exposure means. This method is a method in which the photosensitive member surface is exposed to light before the image formation by using the exposure means for performing latent image formation during normal image formation.

First Embodiment

[1. Image Forming Apparatus]

Figure 1:
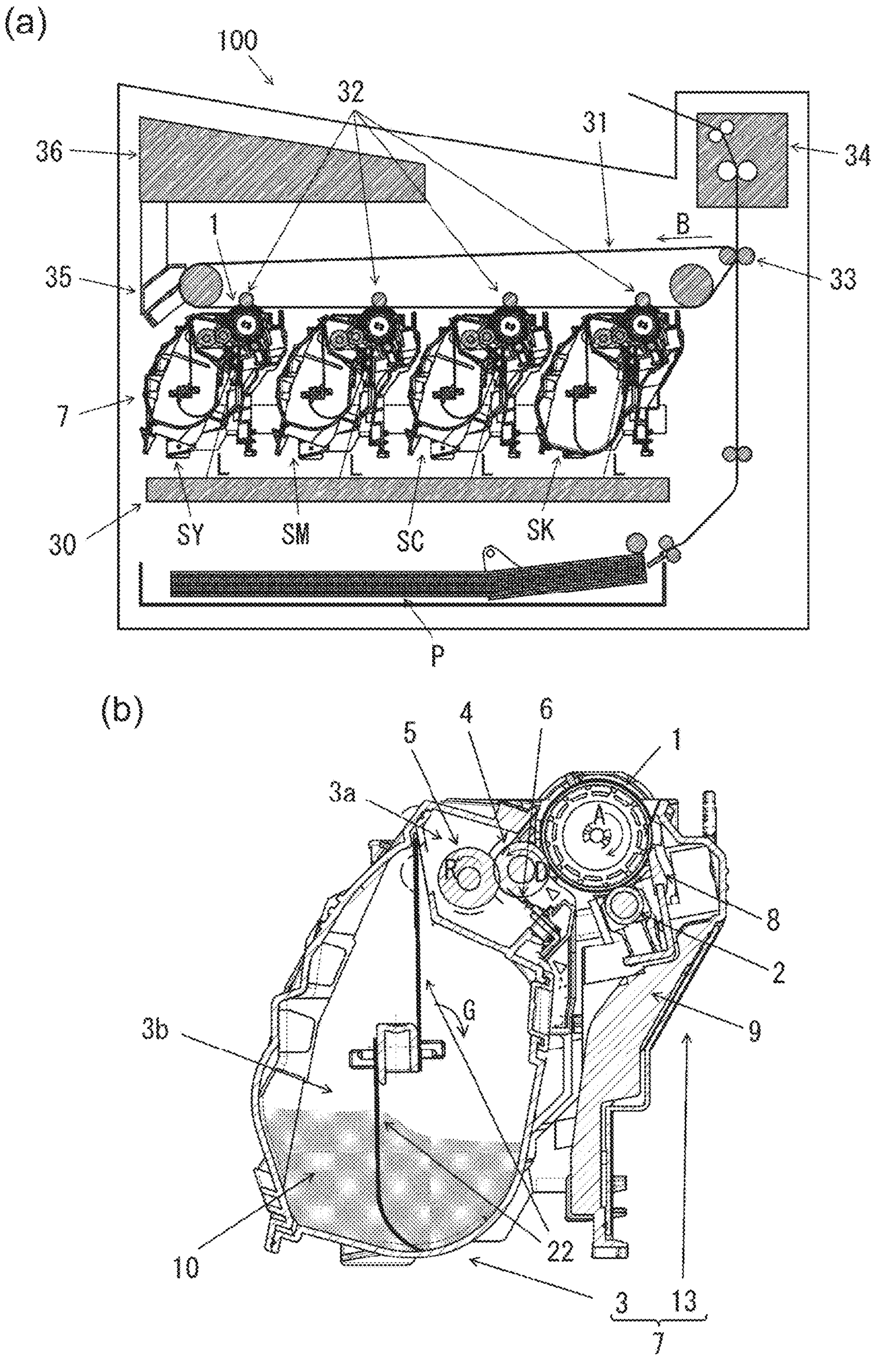

A general structure of an image forming apparatus of an electrophotographic type will be described. Part (a) of FIG. 1 is a schematic sectional view of an image forming apparatus 100, and part (b) of FIG. 1 is a sectional view of a process cartridge 7 as viewed along a longitudinal direction (rotational axis direction) of the photosensitive drum 1 as a rotatable member. The image forming apparatus 100 is a full-color laser printer employing an in-line type system and an intermediary transfer type method. The image forming apparatus 100 is capable of forming a full-color image on a recording material P (for example, a recording sheet, a plastic sheet, a cloth, and so on) in accordance with image information. The image information is inputted from an image reading device (not shown) connected to the image forming apparatus 100 or a host device (not shown), such as a personal computer communicatably connected to the image forming apparatus 100, to the image forming apparatus 100.

The image forming apparatus 100 includes, as a plurality of image forming portions, first to fourth image forming portions SY, SM, SC, and SK for forming images of colors of yellow (Y), magenta (M), cyan (C), and black (K), respectively. In the following, to reference numerals or symbols of members contributing formation of respective color toner images, suffixes, Y, M, C, and K for discriminating the colors are added, but are omitted in some instances except for the case where the members for a specific color are described. In this embodiment, the image forming apparatus 100 includes four photosensitive drums 1 which are drum-type electrophotographic photosensitive members juxtaposed as a plurality of image bearing members in a direction crossing a vertical direction. Each of the photosensitive drums 1 is assembled with the image forming portion S, so that a process cartridge 7 is formed.

A rotatable photosensitive drum 1, which is the image bearing member bearing an electrostatic latent image, is rotationally driven in an arrow A direction by a drum driving motor 80 (see FIG. 2), which is a drum driving means. A charging roller 2, which is a charging means, is a single-layer roller comprising an electroconductive core metal and an electroconductive rubber layer, and is, for example, φ7.5 mm in outer diameter and $10^3$ to $10^6$ Ω·cm in volume resistivity. Further, by applying a charging voltage of, for example, −1000 V to the charging roller 2 by a charging voltage (power) source 71 (see FIG. 2), the surface of the photosensitive drum 1 is electrically charged uniformly to −500 V (see part (a) of FIG. 11). To the charging roller 2, a DC voltage consisting of Vd+Vth is applied, so that the surface of the photosensitive drum 1 is uniformly charged by a charging potential Vd by electric discharge. The charging potential Vd at this time is −500 V, for example. Vth is a discharge start voltage, and when an applied charging voltage is small, the surface potential on the photosensitive drum 1 is not increased by the electric discharge, but the surface potential starts to increase from the discharge start voltage Vth by the electric discharge. That is, the discharge start voltage Vth in this embodiment is −500 V.

After the surface of the photosensitive drum 1 is charged by the charging roller 2, the surface of the photosensitive drum 1 is irradiated with laser light L from an exposure unit 30. The exposure unit 30 is an exposure means for forming an electrostatic latent image on the surface of the photosensitive drum 1 by irradiating the photosensitive drum surface with the laser light L on the basis of the image information. The surface of the photosensitive drum 1 irradiated with the laser light L is changed in surface potential to Vl which is an exposure potential of, for example, −100 V, so that the electrostatic latent image is formed (see part (b) of FIG. 11).

The process cartridge 7 is constituted by a developing unit 3 as a developing means and a photosensitive drum unit 13. In the developing unit 3, a developing roller 4, which is a developer carrying member, and a toner supplying roller 5, which is a toner supplying member, are provided. In the developing unit 3, a developing chamber 3*a*, a toner accommodating portion 3*b*, a developing blade 6, and a toner feeding member 22 for feeding toner 10, which is a developer, to the developing chamber 3*a* by being rotated in an arrow G direction are provided. By receiving a driving force of a development driving motor 79 (see FIG. 2), which is a development driving means, the developing roller 4 and the supplying roller 5 start rotation in an arrow D direction and an arrow R direction, respectively. Further, to the developing roller 4, as a developing voltage, for example, a voltage of −300 V is applied from a developing voltage (power) source 72 (see FIG. 2), which is a second voltage applying means. By this, to the electrostatic latent image formed on the surface of the photosensitive drum 1, i.e., to the above-described portion of the exposure portion potential Vl, the toner 10 is supplied by the developing roller 4, so that the electrostatic latent image is developed. Incidentally, a developing clutch 84 (see FIG. 2) for transmitting and interrupting the driving force of the development driving motor 79 is provided, so that a driving timing of each of the developing units of the respective colors can be controlled.

A developer image (toner image) formed on the surface of the photosensitive drum 1 by development is transferred onto an intermediary transfer belt 31 which is an intermediary transfer member shown in part (a) of FIG. 1. The intermediary transfer belt 31 formed with an endless belt as the intermediary transfer member is a member which opposes the photosensitive drum 1 of each image forming portion S and which is for transferring the toner image from the photosensitive drum 1 onto the recording material P. The intermediary transfer belt 31 contacts the photosensitive drum 1 of each image forming portion S and is circulated and moved (rotated) in an arrow B direction (counterclockwise direction).

On an inner peripheral surface side of the intermediary transfer belt 31, primary transfer rollers 32 which are transfer members as primary transfer means are provided so as to oppose the associated photosensitive drums 1, respectively. To each of the primary transfer rollers 32, a voltage of a polarity opposite to a normal charge polarity of the toner is applied from a primary transfer voltage (power) source 76 (see FIG. 2). By this, the toner image on the photosensitive drum 1 is transferred (primary-transferred) onto the intermediary transfer belt 31. The polarity of the toner in this embodiment is a negative polarity as a normal polarity. Accordingly, it is possible to execute the primary transfer by applying a voltage of a positive polarity as a primary transfer voltage (transfer voltage). Incidentally, the intermediary transfer belt 31 and the primary transfer roller 32 are capable of being contacted to the photosensitive drum 1 (contact state) or separated from the photosensitive drum 1 (separation state) via a primary transfer contact and separation mechanism 83 (see FIG. 2) as a primary transfer contact and separation means. Further, in this embodiment, drive of both the photosensitive drum 1 and the intermediary transfer belt 31 is obtained from the drum driving motor 80, and by a drum clutch 85 (see FIG. 2), ON/OFF of the drive of each of the photosensitive drum 1 and the intermediary transfer belt 31 is made switchable.

Further, on an outer peripheral surface side of the intermediary transfer belt 31, a secondary transfer roller 33 as a secondary transfer means is provided. To the secondary transfer roller 33, a voltage of the polarity opposite to the polarity of the toner is applied from a secondary transfer voltage (power) source 77 (see FIG. 2) as a secondary transfer voltage applying portion. By this, the toner image on the intermediary transfer belt 31 is transferred (secondary-transferred) onto the recording material P. In the following, a position where the toner image is secondary-transferred onto the recording material P is referred to as a secondary transfer portion. For example, during full-color image formation, the above-described processes are successively executed in the image forming portions SY, SM, SC, and SK, so that toner images of the respective colors are successively primary-transferred superposedly onto the intermediary transfer belt 31. Thereafter, the recording material P is conveyed to the secondary transfer portion in synchronism with movement of the intermediary transfer belt 31. Then, by the action of the secondary transfer roller 33 contacting the intermediary transfer belt 31 via the recording material P, the four color toner images on the intermediary transfer belt 31 are collectively secondary-transferred onto the recording material P. The recording material P on which the unfixed toner images are transferred is conveyed to a fixing device 34. In the fixing device 34, heat and pressure are applied, so that the toner images are fixed on the recording material P and then, the recording material S is discharged to an outside of the image forming apparatus 100.

Further, toner remaining on the surface of the photosensitive drum 1 without being transferred by the primary transfer roller 32 is scraped off from the surface of the photosensitive drum 1 by the cleaning blade 8 which is a cleaning member contacting the photosensitive drum 1. The toner scraped off by the cleaning blade 8 is accommodated into a residual toner accommodating chamber 9 provided below the cleaning blade 8. Toner remaining on the intermediary transfer belt 31 without being transferred on the recording material P by the secondary transfer roller 33 is conveyed to and removed by a belt cleaning device 35 as a cleaning device for the intermediary transfer belt 31, and is accommodated in a residual toner accommodating container 36. The controller 202 will be described later.

[2. Schematic Structure of Process Cartridge]

A general structure of the process cartridge 7 mounted in the image forming apparatus 100 will be specifically described using part (b) of FIG. 1. The process cartridge 7 is detachably mountable to the image forming apparatus 100 via mounting means such as a mounting guide (not shown), a positioning member (not shown), and the like provided in the image forming apparatus 100. In other words, the process cartridge 7 is capable of being inserted into and extracted from the image forming apparatus 100. In this embodiment, the process cartridges 7 for the respective colors have the same shape. In these process cartridges 7, toners 10 of the colors of yellow (Y), magenta (M), cyan (C), and black (K) are accommodated, respectively. In this embodiment, the process cartridge 7 will be described, but a constitution including a developing cartridge in which the developing unit 3 is singly detachably mountable to the image forming apparatus 100 may be employed. Incidentally, in this embodiment, structures and operations of the process cartridges 7 for the respective colors are substantially the same except for a kind (color) of the toner 10 accommodated.

The process cartridge 7 includes the developing unit 3 provided with the developing roller 4 and the like, and the photosensitive drum unit 13 provided with the photosensitive drum 1. In this embodiment, the developing unit 3 and the photosensitive drum unit 13 are integrally assembled into the process cartridge 7, but the present invention is not limited thereto. For example, these units may be constituted as a developing cartridge and a photosensitive drum cartridge, respectively, each detachably mountable to the image forming apparatus 100.

The developing unit 3 is roughly divided into the developing chamber 3*a* and the toner accommodating portion 3*b*. The toner accommodating portion 3*b* is provided with the toner feeding member 22 for feeding the toner 10 to the developing chamber 3*a*.

The toner feeding member 22 feeds the toner 10 to the developing chamber 3*a* by being rotated in an arrow G direction in part (b) of FIG. 1. In the developing chamber 3*a*, the developing roller 4 as a developer carrying member rotating in an arrow D direction in contact with the photosensitive drum 1 is provided. In this embodiment, the developing roller 4 and the photosensitive drum 1 are rotated so that their surfaces move in the same direction in an opposing developing portion. Inside the developing chamber 3*a*, the toner supplying roller 5 and the developing blade 6 are disposed. The toner supplying roller 5 supplies, to the developing roller 4, the toner 10 fed from the toner accommodating portion 3*b*. The developing blade 6 is a toner regulating member for performing coating amount regulation of and electric charge impartment to the toner 10 on the developing roller 4 supplied by the toner supplying roller 5.

Figure 2:
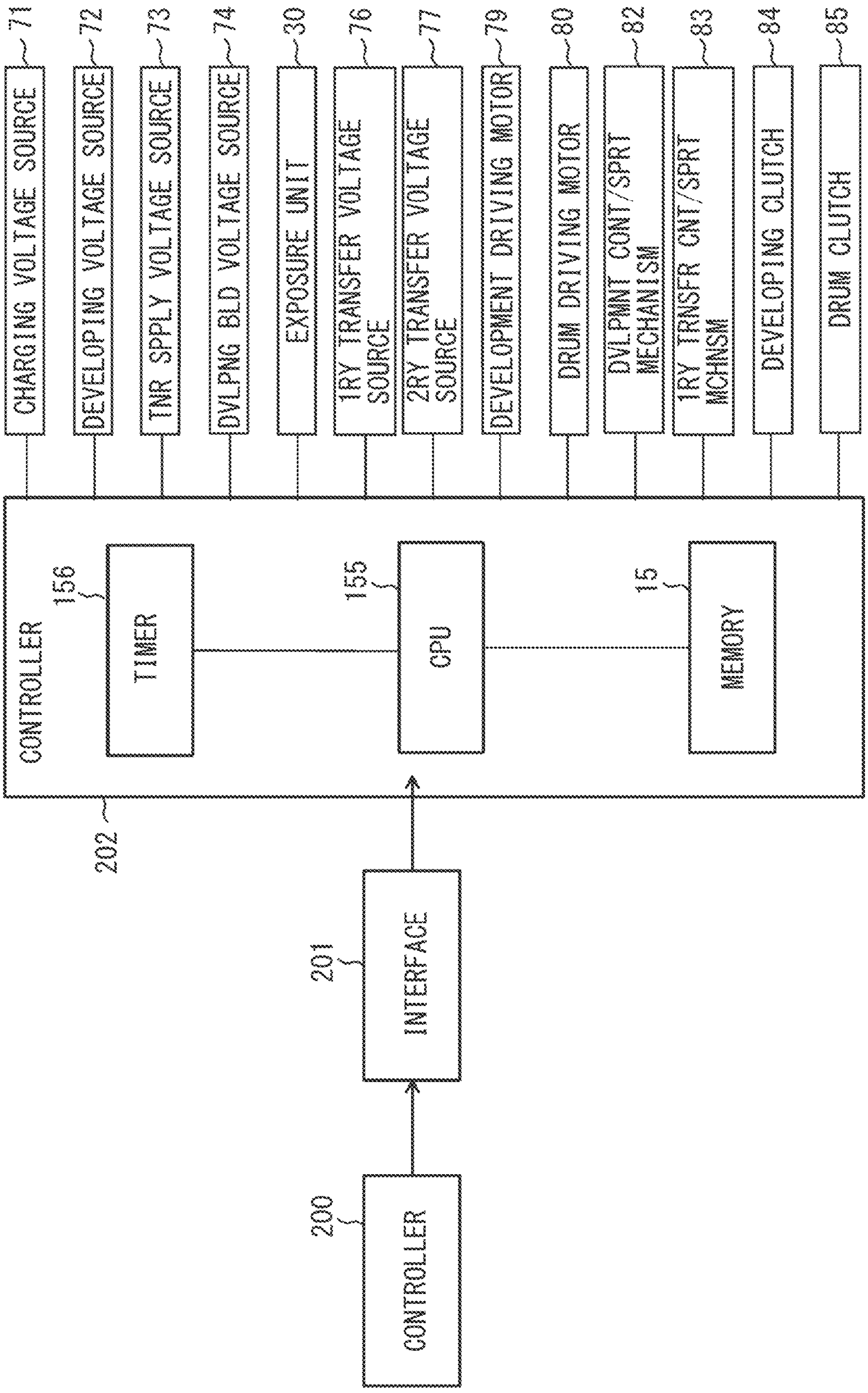
FIG. 2 is a schematic block diagram showing a control mode of the image forming apparatus.

To each of the developing roller 4, the toner supplying roller, and the developing blade 6, an independent voltage is applied from the associated power source (see FIG. 2). The toner 10 supplied to the developing roller 4 by the toner supplying roller 5 is charged by friction between the developing roller 4 and the developing blade 6, so that electric charges are imparted to the toner 10 and a layer thickness of the toner 10 is regulated. The toner 10 on the developing roller 4 regulated in layer thickness is conveyed to the opposing portion opposed to the photosensitive drum 1 by rotation of the developing roller 4, and the electrostatic latent image on the photosensitive drum 1 is developed and visualized as the toner image.

During the image forming operation, a predetermined DV voltage (developing voltage: Vdc) applied to the developing roller 4 is −300 V. Further, by applying a voltage (toner supply voltage: Vr=−450 V) to the toner supplying roller 5, a potential difference (ΔVr) between the toner supplying roller 5 and the developing roller 4 is adjusted, so that a supply amount of the toner 10 to the developing roller 4 is adjusted. In the embodiment 1, ΔVr=Vdc−Vr is set to +150 V (=−300V−(−450V)), so that a potential setting in which negatively chargeable toner is liable to move from the toner supplying roller 5 to the developing roller 4 is made.

When the electrostatic latent image on the photosensitive drum 1 is developed and visualized, the developing roller 4 is rotationally driven so as to contact a peripheral surface of the photosensitive drum 1.

To the photosensitive drum unit 13, the photosensitive drum 1 is rotatably mounted via bearings (not shown). The photosensitive drum 1 is rotationally driven in an arrow A direction in part (b) of FIG. 1 by receiving a driving force of the drum driving motor 80. Further, in the photosensitive drum unit 13, the charging roller 2 and the cleaning blade 8 as a plate-like elastic member are disposed so as to contact the peripheral surface of the photosensitive drum 1. The cleaning blade 8 is fixed to a metal plate at one end thereof and is contacted to the photosensitive drum 1 at the other (free) end thereof with respect to a counter direction to rotation of the photosensitive drum 1, so that the cleaning blade 8 forms a cleaning nip which is a contact portion between itself and the photosensitive drum 1. The surface of the photosensitive drum 1 is rubbed with the cleaning blade 8, so that the toner 10 and fine particles which remain in the transfer step and scraped off and are accommodated in the residual toner accommodating portion 9. By this, image defects due to contamination of the charging roller 2 and movement of the toner 10 by the photosensitive drum 1 are prevented from occurring.

[3. Structure of Photosensitive Drum]

The photosensitive drum 1 is constituted by a cylindrical metal support member having electroconductivity, an electroconductive layer as an undercoat layer of the support member, photosensitive layers (charge generation layer, charge transport layer) formed on the undercoat layer, and a protective layer formed on the photosensitive layer. The photosensitive drum 1 is constituted by providing a photosensitive material, such as an organic photo-semiconductor (OPC), amorphous selenium, or amorphous silicon, on a cylindrical drum substrate composed of aluminum, nickel, or the like having an outer diameter of φ24 mm and serving as a supporting member. Furthermore, the photosensitive drum 1 in the embodiment 1 has a wear-resistant protective layer as an outermost surface layer in order to improve the wear resistance. By providing the protective layer, durability can be improved. In this embodiment, the protective layer is provided, but may also be not provided.

The protective layer may preferably contain electroconductive particles and/or a charge transport substance, and a resin.

Examples of the electroconductive particles may include particles of metal oxides such as titanium oxide, zinc oxide, tin oxide, and indium oxide. Examples of the charge transport material may include polycyclic aromatic compounds, heterocyclic compounds, hydrazone compounds, styryl compounds, enamine compounds, benzidine compounds, triarylamine compounds, and resins having groups derived from these substances. Among these, the triarylamine compounds and the benzidine compounds are preferable. Examples of the resin may include polyester resins, acrylic resins, phenoxy resins, polycarbonate resins, polystyrene resins, phenolic resins, melamine resins, and epoxy resins. Among these, the polycarbonate resins, the polyester resins, and the acrylic resins are preferable.

The protective layer may be formed as a cured film obtained by polymerizing a composition containing a monomer having a polymerizable functional group. Reaction during polymerization may include a thermal polymerization reaction, a photopolymerization reaction, and a radiation polymerization reaction. The polymerizable functional group in the monomer having the polymerizable functional group may include an acrylic group and a methacrylic group. As the monomer having the polymerizable functional group, a material having a charge transport property may be used.

The protective layer may contain additives such as an antioxidant, a UV absorber, a plasticizer, a leveling agent, a lubrication imparting agent, and a wear resistance improver. Specific examples thereof may include hindered phenol compounds, hindered amine compounds, sulfur compounds, phosphorus compounds, benzophenone compounds, siloxane-modified resins, silicone oil, fluororesin particles, polystyrene resin particles, polyethylene resin particles, silica particles, alumina particles, and boron nitride particles. The protective layer may preferably have an average thickness of 0.5 μm or more and 10 μm or less, more preferably 1 μm or more and 7 μm or less.

The protective layer can be formed by preparing a protective layer-forming coating solution containing the above-described materials and a solvent, forming a coating film of this coating solution, and drying and/or curing the coating film. The solvent used in the coating solution may include alcohol solvents, ketone solvents, ether solvents, sulfoxide solvents, ester solvents, and aromatic hydrocarbon solvents. In this embodiment, the average thickness of the protective layer was made 3 μm.

[4. Control Mode of Image Forming Apparatus]

Next, a control mode of the image forming apparatus 100 will be described. FIG. 2 is a block diagram showing a schematic control mode of a principal part of the image forming apparatus 100 of this embodiment. The controller (control portion) 202 is a control member for controlling an operation of the image forming apparatus 100, and transmits and receives various electric information signals. Further, the controller 202 performs processing of the electric information signals inputted from various process devices and processing of instruction signals to the various process devices. The controller 200 not only transmits and receives various electric pieces of information between itself and a host device (not shown), but also causes the control portion (controller) 202 to integrally control an image forming operation of the image forming apparatus 100 via an interface 201 in accordance with a predetermined control program and a reference table. The controller 202 is constituted by including a CPU (Central Processing Unit) 155, a memory 15, and a timer 156 and the like. The CPU 155 is a central element for performing various arithmetic operations (processing). The memory 15 is RAM (Random Access Memory), ROM (Read Only Memory), or the like, and is a storing element. The timer 156 measures a time. In the RAM, a detection result of a sensor, a count result of a counter, an operation (processing) result, and the like are stored, and in the ROM, a control program, and a data table obtained in advance by an experiment are stored. To the controller 202, various control objects, the sensor(s), the counter(s), and the like are connected.

The controller 202 controls transmission and reception of various electric information signals and drive timings of the respective portions, and the like, and thus controls a predetermined image forming sequence and the like. For example, the controller 202 controls the following high-voltage power sources and devices in order to form the toner image on the photosensitive drum 1. The controller 202 carries out control of the charging voltage source 71 for applying the charging voltage, the developing voltage source 72 for applying the developing voltage, the toner supply voltage source 73 for applying the toner supply voltage to the toner supplying roller 5. Further, the controller 202 carries out control of the developing blade voltage source 74 which is a power source for the developing blade 6 which is a toner regulating member. Further, the controller 202 carries out control of the exposure unit 30 and the like. Further, the controller 202 carries out control of the primary transfer voltage source 76, the secondary transfer voltage source 77, and the like for forming the toner image on the recording material P. Further, the controller 202 carries out control of the development driving motor 79 for controlling drive of the developing unit 3 and the drum driving motor 80 for controlling the intermediary transfer belt 31 and the photosensitive drum 1. Further, the controller 202 carries out control of the developing clutch 84 for transmitting and interrupting the driving force of the development driving motor 79 to the developing unit 3 and the drum clutch 85 for transmitting and interrupting the driving force of the drum driving motor 80 to the photosensitive drum 1. Further, the controller 202 carries out control of the development contact and separation mechanism 82 as a development contact/separation means for controlling contact and separation between the developing roller 4 and the photosensitive drum 1 and the primary transfer contact and separation mechanism 83 for controlling contact and separation between the photosensitive drum 1 and the intermediary transfer belt (primary transfer roller 32).

[5. Characteristic of Pre-Exposure Sequence and Execution Propriety Discrimination Procedure]

In this embodiment, the process cartridge 7 is provided with the memory 15 as a storing means. As the storing means, for example, it is possible to use arbitrary forms such as a contact non-volatile memory, a non-contact non-volatile memory, and a volatile memory including a power source. In this embodiment, the memory 15, which is the non-contact non-volatile memory, is installed as the storing means to the process cartridge 7. The memory 15 includes an antenna (not shown), which is a memory-side information transmission means, and establishes communication with the controller 202 provided in a main assembly of the image forming apparatus 100 through wireless communication, so that it is possible to read and write the information. In this embodiment, the controller 202 has functions of a main assembly-side information transmission means of the image forming apparatus 100 and an information reading and writing means of the memory 15. In this memory 15, information on sensitivity of the photosensitive drum 1 (described later) is stored. This embodiment is characterized in that whether or not the pre-exposure sequence is executed is discriminated depending on the information on the sensitivity of the photosensitive drum 1 stored in the memory 15.

As described above, after charging of the surface of the photosensitive drum 1 by the charging roller 2, the photo-carrier generates at the portion exposed to light inside the photosensitive drum 1 by the exposure unit 30, and this photo-carrier and the negative (electric) charge accumulated on the surface of the photosensitive drum 1 by the charging cancel each other. By this, the potential of the portion exposed to light on the photosensitive drum 1 becomes lower than the charging potential (Vd), so that the exposure potential (Vl) is formed.

<Relationship Between Film Thickness (Thickness) of Charge Generation Layer and Negative Ghost>

[1] Case Where Film Thickness of Charge Generation Layer is Thin

As described above, the negative ghost generates in a process in which the photo-carrier is accumulated. When the film thickness of the charge generation layer is thin, a photo-carrier generation amount is small and it takes time until the remaining photo-carrier is accumulated, and therefore, the negative ghost generates.

In the following, details will be described. When a whole black image is printed with strong exposure in a state (new article state or after standing for a long time) in which there is no remaining photo-carrier, a normal potential is formed as described in the "RELATED ART" section. However, when the exposure is continued, the photo-carrier cannot be bonded to the negative charge on the surface of the photosensitive drum 1, so that the photo-carrier remains in the exposed portion (parts (c) and (d) of FIG. 11). In such a case, the remaining photo-carrier hinders movement of a new photo-carrier toward the charge transport layer (part (e) of FIG. 11). Then, the potential does not lower only in the portion compared with the normal potential (part (f) of FIG. 11), so that the image which is called the negative ghost generates as shown in part (a) of FIG. 12.

Thereafter, the photo-carrier remains, and therefore, even when the exposure is successively repeated, the negative ghost does not generate. That is, a whole surface of the photosensitive drum 1 is exposed to light, and when the photo-carrier remains in a whole region, a potential difference is not formed between the exposed portion and the unexposed portion, so that the negative ghost does not generate.

[2] Case Where Film Thickness of Charge Generation Layer is Thick

When the film thickness of the charge generation layer is thick, the photo-carrier generation amount is large, so that the photo-carrier is quickly accumulated, and therefore, the negative ghost does not generate.

In the following, details will be described. When the whole black image is printed in the state (the new article state or after standing for the long time) in which there is no remaining photo-carrier, an amount of generated photo-carrier is large, and therefore, the photo-carrier cannot be bonded to the negative charge on the surface of the photosensitive drum 1 by initial exposure immediately after the printing, so that the photo-carrier remains (parts (c) and (d) of FIG. 11). In such a case, although the potential does not lower compared with the normal potential even in the initial exposure, the photo-carrier similarly remains even when subsequently the exposure is repeated, and therefore, consequently a difference in exposure potential Vl between the initial (first) exposure and second exposure is small, so that the negative ghost does not generate.

<Relationship Between Film Thickness of Charge Generation Layer and Positive Ghost>

When the film thickness of the charge generation layer is thick, the remaining photo-carrier is strengthened by repetition of the exposure, so that when the photosensitive drum surface is subsequently charged, the charging potential (Vd) cannot be raised to the normal potential by the influence of the remaining photo-carrier. The charging potential (Vd) in the exposed portion lowers, and correspondingly, the exposure potential (Vl) lowers, and therefore, an image which is called the positive ghost generates in some instances. As shown in part (b) of FIG. 12, the positive ghost is a phenomenon such that an image formed on the photosensitive drum 1 before one full circumference becomes thick (black) and is visualized. For that reason, from a viewpoint of the positive ghost, it is desirable that the film thickness of the charge generation layer be as thin as possible.

<Film Thickness of Charge Generation Layer and Measuring Method>

In this embodiment, the above-described case [1] in which the film thickness of the charge generation layer is thin and in which the positive ghost does not generate is employed.

A generation timing of the negative ghost is different depending on the film thickness of the charge generation layer. For this reason, information on the film thickness of the charge generation layer correlating with the sensitivity of the photosensitive drum 1 is stored in the memory 15 of the process cartridge 7.

A measuring method of the film thickness of the charge generation layer will be described. A calibration curve is acquired from a density value measured by pressing a spectrodensitometer (trade name: X-Rite 504/508, manufactured by X-Rite, Inc.) against the surface of the photosensitive drum 1 and a measured value of the film thickness of the charge generation layer by cross-sectional SEM image observation of the charge generation layer. The density value of each of points of the photosensitive drum 1 is converted into a film thickness value by using the acquired calibration curve, so that a film thickness distribution of the charge generation layer was measured precisely and simply. Incidentally, the film thicknesses (herein, the density values before conversion into the film thickness) of the charge generation layer employed in this embodiment are 0.60, 0.70, and 0.80.

<Relationship Between Standing Time and Negative Ghost>

The photo-carrier disappears by a lapse of time, but when the photo-carrier is small in amount, a time until the photo-carrier disappears becomes short. That is, as the film thickness of the charge generation layer becomes thin, the remaining photo-carrier is smaller in amount, and therefore, the time until the photo-carrier disappears becomes shorter, so that the negative ghost generates after the photo-carrier disappears.

<Execution Propriety Discrimination Procedure of Pre-Exposure Sequence>

In this embodiment, as shown in table 1 below, an execution condition based on the film thickness of the charge generation layer and a standing time T which is a standing time is stored in the ROM on the image forming apparatus 100 side. The controller 202 discriminates execution propriety of the pre-exposure sequence depending on the information (film thickness of the charge generation layer) on the sensitivity of the photosensitive drum 1 stored in the memory 15 and the standing time from an end of a printing operation.

TABLE 1

| | STANDING TIME (hr) | | | |
|---|---|---|---|---|
| PDT*[1] | <3 | 3 ≤ & < 6 | 6 ≤ & < 9 | 9 ≤ & < 12 |
| <0.65 | NEC*[2] | EC*[3] | EC | EC |
| 0.65 ≤ & < 0.75 | NEC | NEC | EC | EC |
| 0.75 ≤ & < 0.85 | NEC | NEC | NEC | EC |

*[1]"PDT" is the photosensitive drum thickness (film thickness of charge generation layer).
*[2]"NEC" is non-execution.
*[3]"EC" is execution.

The table 1 shows discrimination of the execution propriety of the pre-exposure sequence in the case where the standing time is less than 3 hours (hr), not less than 3 hr and less than 6 hr, not less than 6 hr and less than 9 hr, and not less than 9 hr and less than 12 hr when the charge generation layer film thickness (photosensitive drum thickness) is less than 0.65, not less than 0.65 and less than 0.75, not less than 0.75 and less than 0.85. For example, in the case where the charge generation layer film thickness is 0.70 (predetermined thickness) classified as not less than 0.65 and less than 0.75 (0.65≤&<0.75), when the standing time is less than 6 hr, discrimination that the pre-exposure sequence is not executed (non-execution) is made. On the other hand, when the standing time is not less than 6 hr (predetermined time), discrimination that the pre-exposure sequence is executed (execution) is made. In the case where the charge generation layer film thickness is the predetermined thickness, discrimination that the pre-exposure sequence is executed is made with a longer standing time.

Further, for example, even in the case where the standing time is not less than 3 hr and less than 6 hr (3≤ & <6), when the charge generation layer film thickness is less than 0.65, discrimination that the pre-exposure sequence is executed is made, and when the charge generation layer film thickness is not less than 0.65, discrimination that the pre-exposure sequence is not executed is made. Thus, even in the same standing time (predetermined time), discrimination that the pre-exposure sequence is executed is made with a thinner thickness (less than the predetermined thickness) of the photosensitive drum 1.

Figure 7:
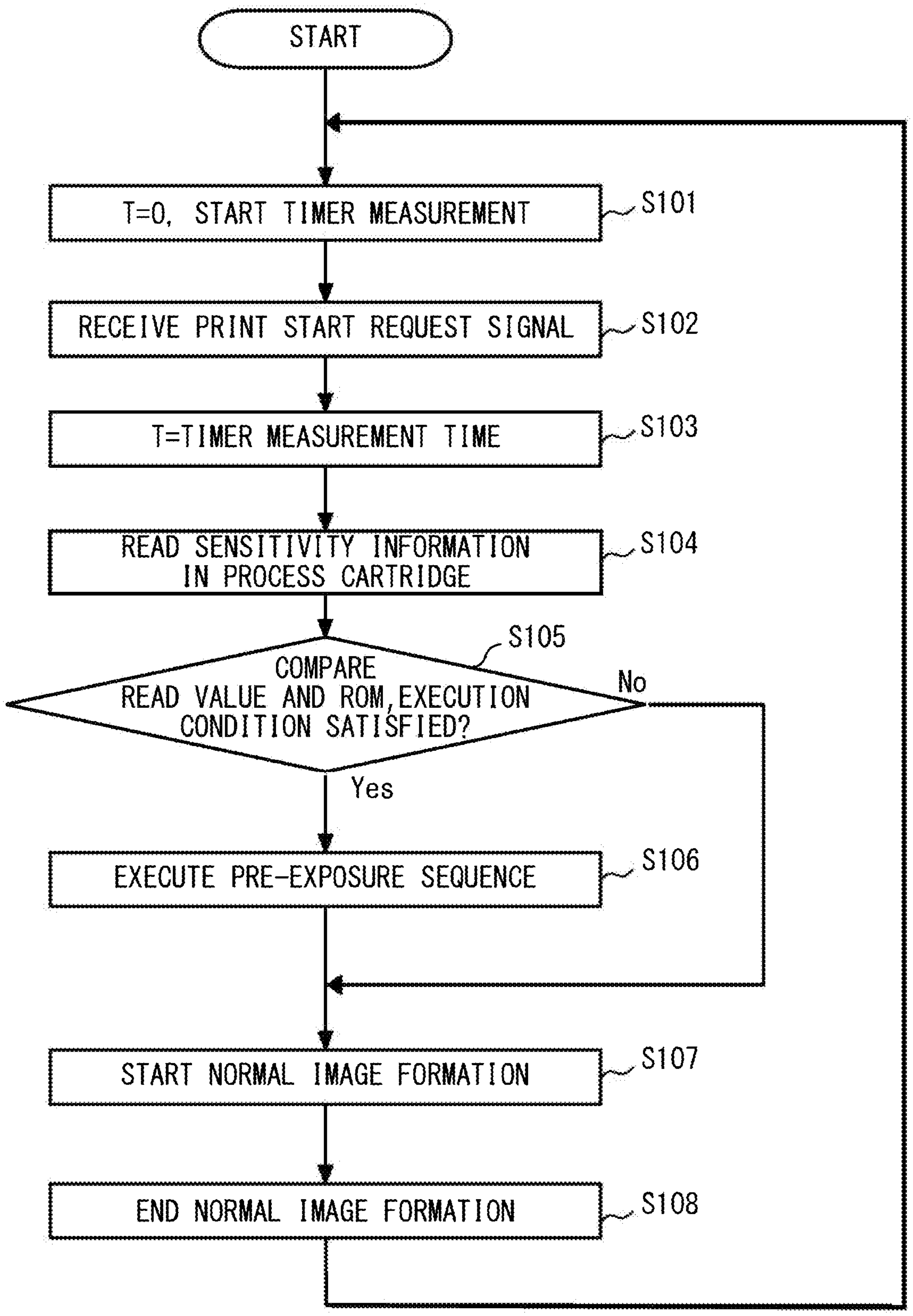
FIG. 7 is a flowchart showing discrimination processing of execution propriety of the pre-exposure.

The execution propriety discrimination procedure of the pre-exposure sequence will be described. FIG. 7 is a flowchart for discriminating the execution propriety of the pre-exposure sequence in this embodiment. In this embodiment, from the end of the printing operation, by the controller 202, ghost counter measure sequence of S101 and later is executed. The controller 202 executes positive ghost of S101 and later when the image formation is ended. In S101, after the end of the image formation, the controller 202 initializes the timer 156 (T=0) and starts measurement of the time by the timer 156. In S102, the controller 202 receives a print start request signal from the controller 200. In S103, the controller 202 acquires a time T measured by the timer 156.

In S104, the controller 202 establishes communication with the memory 15 mounted to the process cartridge through the CPU 155 and reads information (charge generation layer film thickness) on the sensitivity of the process cartridge 7. In S105, the controller 202 discriminates whether or not the execution condition is satisfied from the contents (table 1) of the ROM on the apparatus main assembly of the image forming apparatus 100 side, the charge generation layer film thickness read in S104, and the standing time T measurement-started in S103.

In the case where the controller 202 discriminates in S105 that the execution condition is satisfied, the controller 202 causes processing to go to S106. In S106, the controller 202 executes the pre-exposure sequence. After the pre-exposure sequence of S106 is ended, in S107, the controller 202 starts a normal image forming operation depending on the print start request signal received in S102.

In the case where the controller 202 discriminated in S105 that the execution condition is not satisfied, the pre-exposure sequence is not executed, and in S107, the normal image forming operation is started. In S108, when the image forming operation is ended, the controller 202 returns the processing to S101. The controller 202 rests the value of the standing time to zero (T=0) in S101 and causes the timer 156 to start the measurement of the standing time again, and then prepares for subsequent print start request signal reception.

For example, in the case where the thickness of the photosensitive drum 1 read from the memory 15 of the process cartridge 7 is less than 0.65 and the standing time T measured by the timer 156 is not less than 3 hr and less than 6 hr, the controller discriminates from the table 1 that the execution condition is satisfied. Further, for example, in the case where the thickness of the photosensitive drum 1 read from the memory 15 of the process cartridge 7 is less than 0.65 and the standing time T measured by the timer 156 is less than 3 hr, the controller 202 discriminates from the table 1 that the execution condition is not satisfied.

[6. Execution Procedure of Pre-Exposure Sequence]

Figure 3:
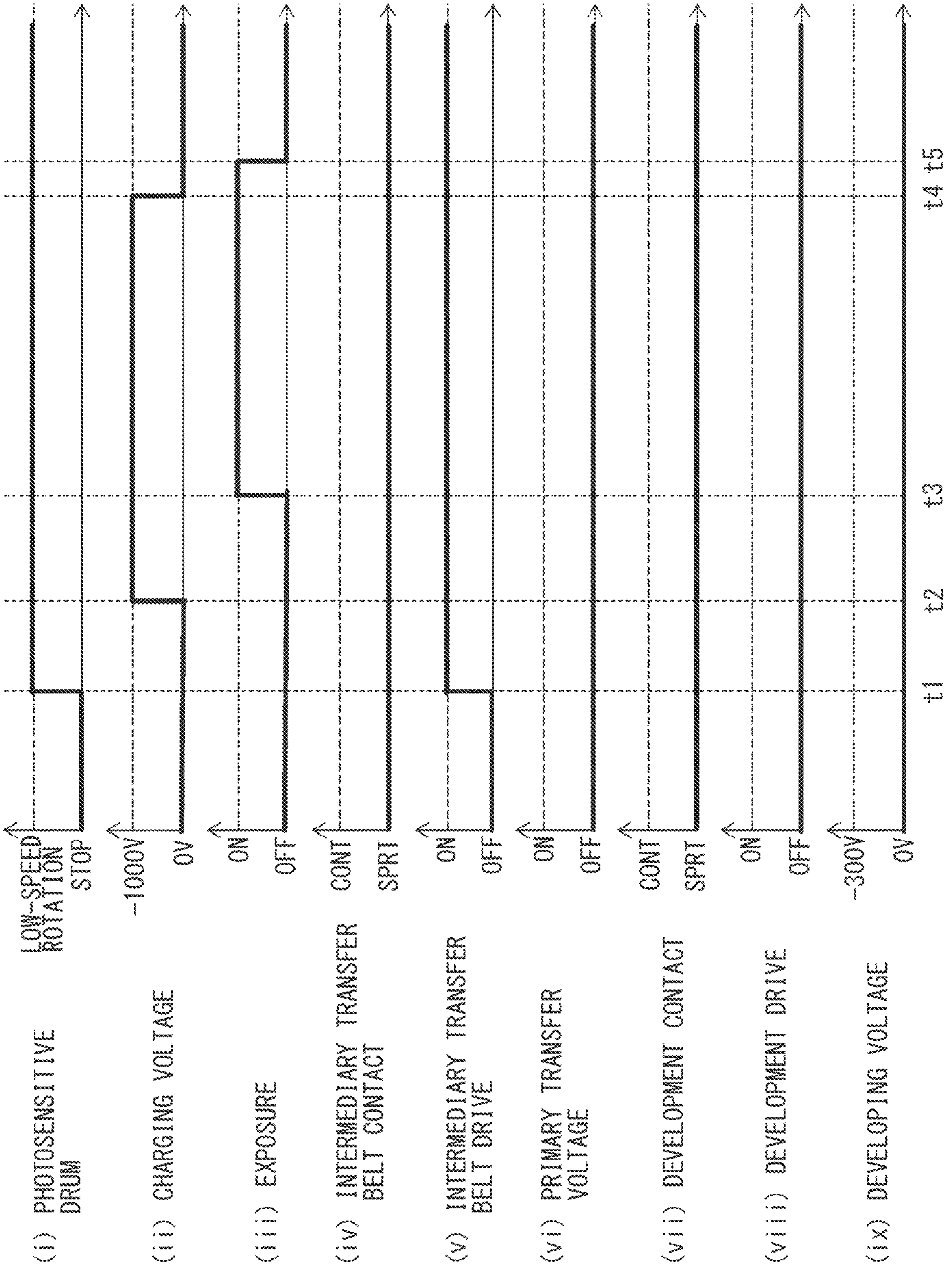
FIG. 3 is a timing chart showing pre-exposure.

Next, an execution procedure of the pre-exposure sequence in S106 of FIG. 7 will be described. FIG. 3 is a time chart of the pre-exposure sequence in this embodiment. In FIG. 3, (i) shows a state (stop, low-speed rotation) of the photosensitive drum 1, (ii) shows an applied state of the charging voltage (V), and (iii) shows a state (ON, OFF) of the exposure. Further, (iv) shows a state of contact and separation of the intermediary transfer belt 31, (v) shows a state (ON, OFF) of drive of the intermediary transfer belt 31, and (vi) shows an applied state of the primary transfer voltage (V). Further, (vii) shows a state of contact and separation of the developing roller 4 to and from the photosensitive drum 1, respectively, (viii) shows a state (ON, OFF) of drive of the developing roller 4, and (ix) shows an applied state of the developing voltage (V). In FIG. 7, each of the abscissa represents a time. In FIGS. 7, t1 to t5 show timings (points of time).

First, at the timing t1, the photosensitive drum 1 is started to be rotated at a low speed by the drum driving motor 80. Here, the image forming apparatus 100 of this embodiment is capable of performing the image forming operation at a plurality of image forming speeds. The controller 202 executes the pre-exposure sequence by rotating the photosensitive drum 1 at the slowest image forming speeds of the plurality of image forming speeds. Thus, the photosensitive drum 1 is rotated at the slowest speed of operable speeds during image formation. By rotating the photosensitive drum 1 at the slowest speed, it is possible to enhance a negative ghost alleviating effect while suppressing an increase in number of times of rotation of the photosensitive drum 1. Further, the drive of the intermediary transfer belt 31 is transmitted from the drum driving motor 80, and therefore, the intermediary transfer belt 31 also starts drive thereof with the start of the rotation of the photosensitive drum 1. Further, although the intermediary transfer belt 31 and the photosensitive drum 1 are put in separation state before execution of this sequence by the primary transfer contact and separation mechanism 83, also at this time, the intermediary transfer belt 31 and the photosensitive drum 1 are kept in the separation state. Further, the primary transfer voltage by the primary transfer voltage source 76 is 0 V (OFF). Further, although the developing roller 4 and the photosensitive drum 1 are also put in a separation state before execution of this sequence by the development contact and separation mechanism 82, also at this time, the developing roller 4 and the photosensitive drum 1 are kept in the separation state. The developing voltage by the developing voltage source 72 is 0 V.

Next, at the timing t2, by the charging voltage source 71, the charging voltage is applied to the charging roller 2. The charging voltage at this time is −1000 V. Then, at the timing t3 which is a timing when a portion charged at the timing t2 reaches the exposure position, exposure of the photosensitive drum 1 to light is started by the exposure unit 30. Here, the exposure of the photosensitive drum 1 to light with respect to a longitudinal direction is performed in a whole region of an image forming width or more, and a laser light quantity is the same as a laser light quality during the image formation at a normal speed, and thus is stronger than a laser light quantity during the image formation in a low-speed mode. By this, the photosensitive drum 1 is irradiated with stronger laser light, so that the negative ghost alleviating effect is enhanced. Further, by rotating the photosensitive drum 1 at the low speed, an occurrence of vibration can be suppressed, so that an occurrence of exposure non-uniformity can be suppressed.

Further, in synchronism with a timing when with respect to a circumferential direction of the photosensitive drum 1, exposure corresponding to approximately one rotation (one full circumference) is ended, first, at the timing t4, the charging voltage is stopped, and then, at the timing t5, the exposure is stopped, and the processing goes to the normal image forming operation as it is. Incidentally, in this embodiment, the controller 202 stops the exposure in a time corresponding to one full circumference of the photosensitive drum 1, but the timing when the exposure is stopped may also be a timing corresponding to not less than the one full circumference of rotation of the photosensitive drum 1.

In this embodiment, the rotation speed of the photosensitive drum 1 during the pre-exposure sequence is made the slowest speed of the operable speeds during the image formation, but is not limited thereto, and the sequence may be executed at a low speed at which the drive is stabilized.

[7. Verification of Effect]

In order to verify an effect of this embodiment, a printing test was conducted in an environment under a low-temperature and low-humidity condition (temperature: 23 °C, humidity: 50% RH). In this verification, the film thickness of the charge generation layer was 0.60, the peripheral speed of the photosensitive drum 1 during image printing was 321 mm/sec, and the peripheral speed of the photosensitive drum 1 during execution of the pre-exposure sequence was 91 mm/sec. At this time, when the printed image was checked, even on the printed images after a stop of 5 hours and after a stop of 8 hours, the pre-exposure sequence was executed on the basis of the table 1, and therefore, formation of a lateral stripe image due to the negative ghost or exposure non-uniformity was not observed.

Figure 4:
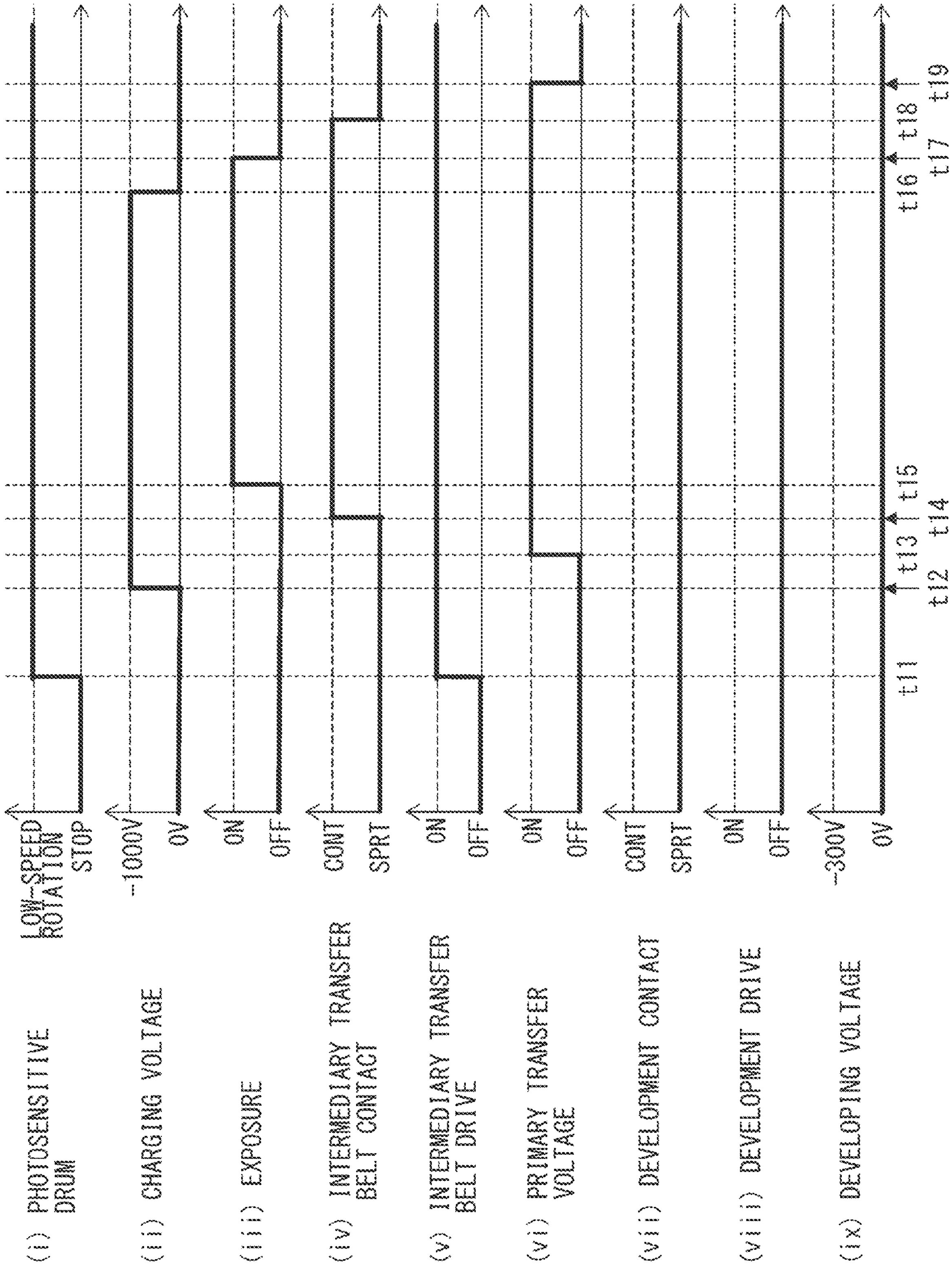
FIG. 4 is a timing chart showing conventional pre-exposure for comparison.

In order to clarify an effect of this embodiment, as a comparison example, a similar printing test was conducted in a constitution in which the photosensitive drum 1 and the intermediary transfer belt 31 which is the transfer means are not separated from each other during the pre-exposure sequence. FIG. 4 is a timing chart showing a sequence of the comparison example, and (i) to (ix) are similar to (i) to (ix) of FIG. 3. Further, t11 to t19 show timings.

As shown in FIG. 4, in the comparison example, (iv) exposure is executed while the photosensitive drum 1 and the intermediary transfer belt 31 are kept in the contact state. At the timing t11, both the photosensitive drum 1 and the intermediary transfer belt 31 are rotationally driven. Then, at the timing t12, the charging voltage is applied to the charging roller 2 by the charging voltage source 71. Next, at the timing t13, to the primary transfer roller 32, the primary transfer voltage similar to the primary transfer voltage during the image formation is applied from the primary transfer voltage source 76. Then, at the timing t14, by the primary transfer contact and separation mechanism 83, the intermediary transfer belt 31 is contacted to the photosensitive drum 1. Then, at the timing t15, by the exposure unit 30, the exposure of the photosensitive drum 1 to light is started. In synchronism with a timing when the exposure corresponding to almost one rotation of the photosensitive drum 1 is ended, first, at the timing t16, the application of the charging voltage is stopped, and then, at the timing t17, the exposure is stopped. Then, at the timing t18, the intermediary transfer belt 31 is separated from the photosensitive drum 1, and at the timing t19, the application of the primary transfer voltage is stopped.

In the comparison example, a predetermined time for execution of the pre-exposure sequence was set to 6 hours, and when 6 hours or more has elapsed from the end of the image formation, the pre-exposure sequence was executed. Further, in this printing test, the peripheral speed of the photosensitive drum 1 during the image printing was 321 mm/sec, and the peripheral speed of the photosensitive drum 1 during the pre-exposure sequence was 91 mm/sec. At this time, when the printed image was checked, the negative ghost was generated on the printed image after a stop of 5 hours.

On the other hand, the generation of the negative ghost was not observed on the printed image after a stop of 8 hours, but the lateral stripe image due to the exposure non-uniformity was formed.

As described above, the following control is carried out when a predetermined time or more has elapsed from the end of the last (immediately-before) image forming operation. That is, the photosensitive drum 1 and the intermediary transfer belt 31 are separated from each other, and further, the photosensitive drum 1 and the developing roller 4 are separated from each other, and the rotation of the developing roller 4 is stopped. In this state, at a speed slower than a speed during normal image formation, the pre-exposure sequence is performed at a laser light quantity similar to the laser light quantity during the normal image formation.

In the first embodiment, the execution propriety of the pre-exposure sequence is discriminated depending on information (film thickness of the charge generation layer) on sensitivity of the photosensitive drum 1 stored in the memory 15 and a standing time from the end of the printing test. By this, occurrences of the negative ghost and the exposure non-uniformity can be suppressed. Further, the influence of the execution of the pre-exposure sequence on the photosensitive member and the developing device can be minimized. Further, the pre-exposure sequence was executed at a necessary timing, and therefore, a number of times of extension of a first print out time which is a time from a start of the printing to a completion of the printing of the image on a first sheet can be minimized, so that productivity can be improved.

Incidentally, there is an interrelation between the sensitivity of the photosensitive drum 1 and the film thickness of the charge generation layer, and in the first embodiment, the film thickness of the charge generation layer was employed as the information on the sensitivity of the photosensitive drum 1 stored in the memory 15, but the present invention is not limited thereto, and the information may only be required to be interrelated with the sensitivity of the photosensitive drum 1.

As described above, according to the first embodiment, while suppressing the generation of the negative ghost due to the photosensitive member, a life time of the developing device can also be maintained with a high image quality. Further, the pre-exposure sequence is executed at a necessary timing, and therefore, the number of times of extension of the first print out time which is the time required from the start of the printing to the completion of the printing of the image on the first sheet can be minimized, so that the productivity can be improved.

Second Embodiment

This embodiment is characterized in that a remaining photo-carrier amount is calculated on the basis of information on use (hereinafter, this information is referred to as use information) and the pre-exposure sequence is executed in the case where the calculated remaining photo-carrier amount is smaller than a threshold. In this embodiment, a portion overlapping with the first embodiment will be omitted from the description, and description will be made on a calculating method of the remaining photo-carrier amount peculiar to this embodiment.

<Calculating Method of Remaining Photo-Carrier Amount>

The calculating method of the remaining photo-carrier amount will be described. As described above, the negative ghost generates in a process in which the photo-carrier is accumulated (in the case where the photo-carrier is small). When the exposure is repeated, the photo-carrier cannot be bonded to the negative charge of the surface of the photosensitive drum 1, so that the photo-carrier remains on the exposed portion (accumulation amount). Further, the remaining photo-carrier attenuates with a lapse of time (attenuation amount). That is, from the accumulation amount and the attenuation amount, the remaining photo-carrier amount during the start of the image formation can be calculated and estimated.

Part (a) of FIG. 8 shows a relationship between a photo-carrier amount generating when the image is printed on a single sheet and a remaining photo-carrier amount after the image is printed on the single sheet, and there is a tendency that the remaining photo-carrier amount becomes smaller when the generated photo-carrier amount is small. Further, the generated photo-carrier amount correlates with a film thickness of the charge generation layer and a print ratio, and is smaller with a thinner film thickness and a lower print ratio. Incidentally, the print ratio is a ratio of an area in which the electrostatic latent image is formed to an area of entirety of an image forming region. Accordingly, on the basis of use information such as the number of printed sheets, the print ratio, or the like, it is possible to calculate the accumulation amount.

Further, part (b) of FIG. 8 shows a relationship between the remaining photo-carrier amount and a standing time, and the remaining photo-carrier amount attenuates with a lapse of time (attenuation amount).

Therefore, the above-described measurement data (parts (a) and (b) of FIG. 8) are stored in advance in the ROM on the apparatus main assembly of the image forming apparatus 100. The remaining photo-carrier amount during the start of the image formation is calculated from a remaining photo-carrier amount (accumulation amount) at a point of time of an end of the last image formation and a standing time T (attenuation amount from the end of the last image formation to a start of this (present) image formation). The calculated remaining photo-carrier amount is stored in the memory 15.

Description will be made specifically using part (c) of FIG. 8. Part (c) of FIG. 8 shows the remaining photo-carrier amount when the image formation and standing are repeated. In part (c) of FIG. 8, the abscissa represents the number of sheets subjected to the image formation, and the ordinate shows the remaining photo-carrier amount. In part (c) of FIG. 8, portions where the number of sheets is unchanged and the remaining photo-carrier amount decreases show that the image forming apparatus is left standing. When the image formation is carried out, the remaining photo-carrier amount increases from the relationship of part (a) of FIG. 8, and lowers from the relationship of part (b) of FIG. 8. Further, by repeating the image formation and the standing, the remaining photo-carrier amount gradually increases. However, when the standing time becomes long, the remaining photo-carrier amount largely lowered (point A), and the negative ghost generated. In this embodiment, the negative ghost generated in the case of not more than a remaining photo-carrier amount indicated by a broken line of part (c) of FIG. 8. For this reason, in this embodiment, the remaining photo-carrier amount indicated by the broken line is set to the threshold, and in the case where the remaining photo-carrier amount during the start of the image formation becomes the threshold or less, a ghost counter measure sequence is executed.

<Execution Propriety Discrimination Procedure of Pre-Exposure Sequence>

In this embodiment, the remaining photo-carrier amount is calculated on the basis of the use information, and depending on a calculated result, whether or not the pre-exposure sequence is executed is discriminated. This sequence is executed before the sequence of the above-described first embodiment. The execution propriety discrimination procedure of the pre-exposure sequence will be described.

FIG. 9 is a flowchart for discriminating the execution propriety of the pre-exposure sequence in this embodiment. In this embodiment, the remaining photo-carrier amount during the start of the image formation is calculated from the remaining photo-carrier amount at the point of time of the end of the last image formation and the standing amount T from the end of the last image formation to the start of this image formation. Then, in the case where the calculated remaining photo-carrier amount is the threshold or less, the ghost counter measure sequence is executed. The controller 202 executes processing of S201 and later when the image formation is ended. In S201, after the end of the image formation, the controller 202 initializes the timer 156 (T=0) and starts measurement of the time by the timer 156. In S202, the controller 202 receives a print start request signal from the controller 200. In S203, the controller 202 acquires a time T measured by the timer 156.

In S204, the controller 202 establishes communication with the memory 15 mounted to the process cartridge through the CPU 155 and reads the remaining photo-carrier amount at the point of time of the end of the last image formation. In S205, the controller 202 calculates the remaining photo-carrier amount from the contents of the ROM on the apparatus main assembly of the image forming apparatus 100 side, in which the data of parts (a) and (b) of FIG. 8 are stored in advance by the CPU 155, the remaining photo-carrier amount (accumulation amount) read in S204, and the standing time T (attenuation amount).

In S206, the controller 202 discriminates whether or not the remaining photo-carrier amount calculated in S205 is the threshold or less. In the case where the controller 202 discriminates in S206 that the calculated remaining photo-carrier amount is the threshold or less, the controller 202 causes processing to go to S207. In S207, the controller 202 executes the pre-exposure sequence. After the pre-exposure sequence of S207 is ended, in S208, the controller 202 starts a normal image forming operation depending on the print start request signal received in S202. In the case where the controller 202 discriminated in S206 that the calculated remaining amount is larger than the threshold, the pre-exposure sequence is not executed, and the controller 202 causes the processing to go to S208, and immediately starts the normal image forming operation.

In S210, when the image formation of S209 is ended, the controller 202 calculates the remaining photo-carrier amount at the point of time of the end of the image formation on the basis of the use information such as the number of printed sheets or the print ratio by a method similar to that of S205, and causes the memory 15 to store the calculated remaining photo-carrier amount, and then causes the processing to be returned to S201. The remaining photo-carrier amount stored in the memory 15 in S210 is read in S204 before a start of subsequent image formation, and is used for discrimination of subsequent pre-exposure sequence.

As described above, in this embodiment, the remaining photo-carrier amount is calculated on the basis of the use information, and the execution propriety of the pre-exposure sequence is discriminated depending on the calculated remaining photo-carrier amount. By this, occurrences of the negative ghost and the exposure non-uniformity can be suppressed. Further, the pre-exposure sequence was executed at a necessary timing, and therefore, a number of times of extension of a first print out time which is a time from a start of the printing to a completion of the printing of the image on a first sheet can be minimized, so that productivity can be improved.

Incidentally, the use information may be information acquired on the basis of the following two pieces of information. The first information may be information of either one of, for example, the number of recording materials (the number of printed sheets) subjected to the image forming operation, the number of times of rotation of the photosensitive drum 1, and the number of sheets of recording materials passed through an inside of the image forming apparatus 100.

Further, the second information is information of the print ratio on a generation amount of charges generated in the charge generation layer of the photosensitive drum 1 during the image forming operation.

As described above, according to this embodiment, while suppressing the generation of the negative ghost due to the photosensitive member, a lifetime of the developing device can also be maintained with a high image quality. Further, the pre-exposure sequence is executed at a necessary timing, and therefore, the number of times of extension of the first print out time which is the time required from the start of the printing to the completion of the printing of the image on the first sheet can be minimized, so that the productivity can be improved.

Third Embodiment

This embodiment is characterized in that an environment sensor is provided inside the main assembly of the image forming apparatus 100 and that whether or not the pre-exposure sequence is executed is discriminated depending on an environment (for example, a temperature and a humidity) in which the image forming apparatus 100 is installed. In this embodiment, a portion overlapping with the above-described embodiments will be omitted from description, and description will be made on a portion peculiar to this embodiment.

In a high-temperature/high-humidity environment, the electric charges are removed immediately, and therefore, the electric charges are not accumulated in the photosensitive drum 1, so that the negative ghost does not readily generate. For that reason, in the high-temperature/high-humidity environment, there is no need to perform the pre-exposure sequence, and therefore, control is carried out so that the pre-exposure sequence is not executed in the case where the environment sensor is used in the high-temperature/high-humidity environment.

[Control Mode of Image Forming Apparatus]

Figure 5:
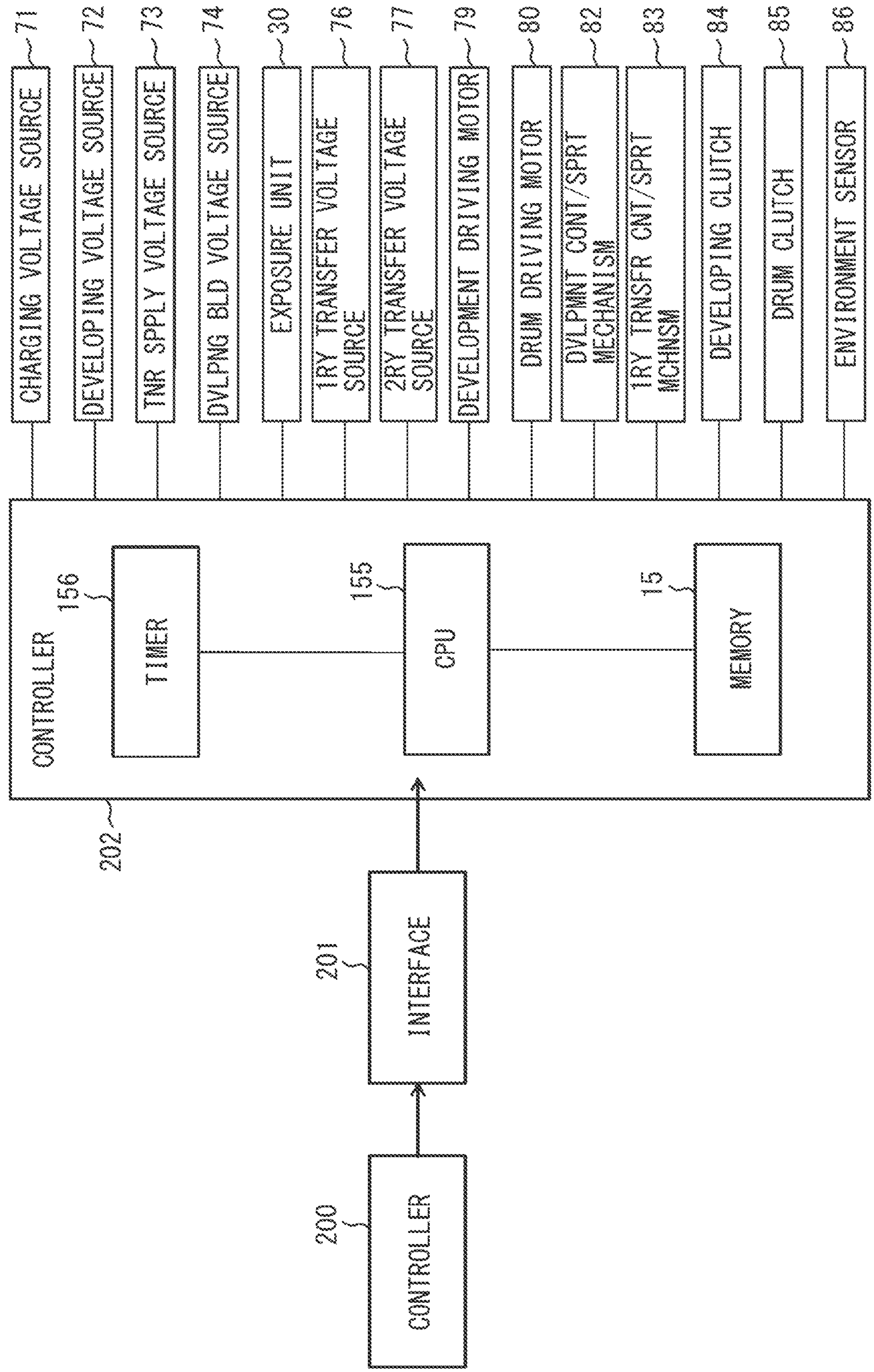
FIG. 5 is a schematic block diagram showing control mode of the image forming apparatus.

FIG. 5 is a block diagram showing a control mode of the image forming apparatus 100 of this embodiment. As shown in FIG. 5, to the controller 202, in addition to the devices in the first embodiment, an environment sensor 86 which is an environment detecting means is connected. The environment sensor 86 is provided inside the main assembly of the image forming apparatus 100, and acquires temperature and humidity information of the inside of the main assembly of the image forming apparatus 100.

Next, the execution propriety discrimination procedure of the pre-exposure sequence will be described.

[Execution Propriety Discrimination of Pre-Exposure Sequence]

Figure 6:
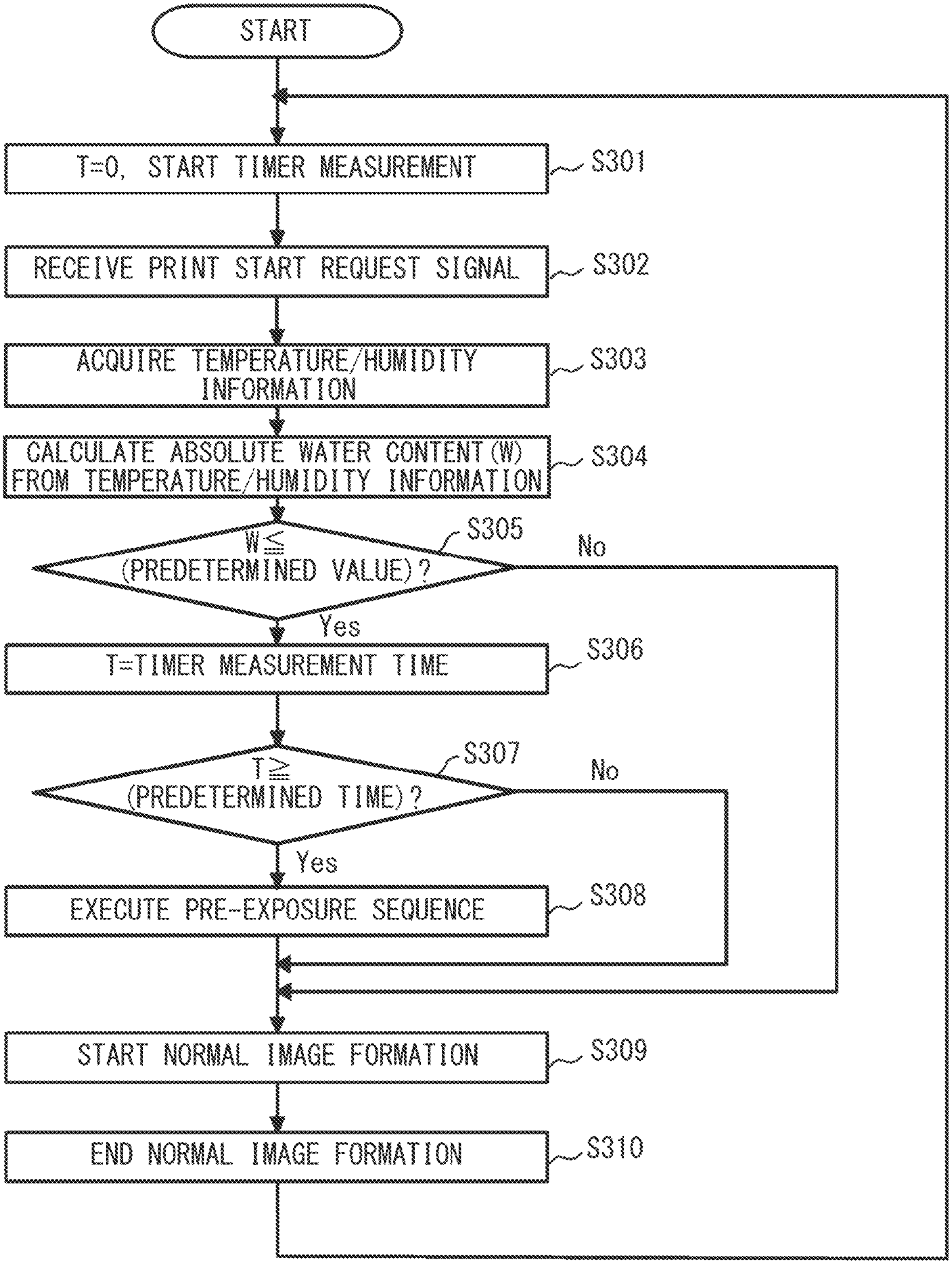
FIG. 6 is a flowchart showing discrimination processing of execution propriety of the pre-exposure.

FIG. 6 is a flowchart for discriminating the execution propriety of the pre-exposure sequence in this embodiment. In this embodiment, when the printing operation is ended, by the controller 202, the ghost counter measure sequence of S301 and later is executed.

In S301, after the end of the image formation, the controller 202 initializes the timer 156 (T=0) and starts measurement of the time by the timer 156. In S302, the controller 202 receives a print start request signal from the controller 200.

In S303, the controller 202 acquires the temperature and humidity information on the basis of a detection result of the environment sensor 86. In S304, the controller 202 calculates an absolute water content W by the CPU 155 by using the temperature and humidity information acquired in S303. In S305, the controller 202 discriminates whether or not the absolute water content W calculated in S304 is not more than a predetermined absolute water content (predetermined value) stored in the memory 15.

In the case where the controller 202 discriminated in S305 that the absolute water content W is larger than the predetermined value, the controller 202 causes the processing to go to S309. In the case where the controller 202 discriminated in S305 that the absolute water content W is not more than the predetermined value, the controller 202 causes the processing to go to S306.

In S306, the controller 202 acquires a standing time T measured by the timer 156.

In S307, the controller 202 reads the predetermined time stored in the memory 15, and discriminates whether or not the standing time T acquired in S306 is not less than the predetermined time. In the case where the controller 202 discriminates in S307 that the standing time T is not less than the predetermined time, the controller 202 causes processing to go to S308. In S308, the controller 202 executes the pre-exposure sequence. After the pre-exposure sequence of S308 is ended, in S309, the controller 202 starts a normal image forming operation depending on the print start request signal received in S302.

In the case where the controller 202 discriminated in S307 that the standing time T is less than the predetermined time, the controller 202 causes the processing to go to S309. At this time, the controller 202 does not execute the pre-exposure sequence, and in S309, the controller 202 starts the normal image forming operation. In S310, when the image forming operation is ended, the controller 202 returns the processing to S301. The controller 202 resets the value of the standing time to zero (T=0) in S301 and causes the timer 156 to start the measurement of the standing time again, and then prepares for subsequent print start request signal reception.

Incidentally, by power saving control or the like of the controller 200, the controller 202 shifts to a sleep mode, and the power (voltage) source on the controller 202 side is turned off in some instances. In this case, on the controller 200 side, the time is measured, by using a time acquired by modifying a time of the timer 156 on the basis of a time acquired from the controller 200, and the propriety discrimination of the sequence operation may be performed.

Incidentally, the pre-exposure sequence in S308 is executed by control similar to the control of FIG. 3.

In this embodiment, the predetermined time is set to 3 hours, and the control is executed in the case where the pre-exposure sequence is stopped for 3 hours or more, but the present invention is not limited thereto. A setting of the predetermined time may be changed depending on a characteristic of the photosensitive drum 1.

Incidentally, the sequence of this embodiment using the environment sensor is executed before the sequence described in the first and second embodiments.

As described above, depending on the environment in which the image forming apparatus 100 is installed, the execution propriety of the pre-exposure sequence is discriminated. By this, the pre-exposure sequence is executed when the use environment is not more than the predetermined absolute water content and a predetermined time or more has elapsed from the last image formation.

That is, the photosensitive drum 1 and the intermediary transfer belt 31 are separated from each other, and further, the photosensitive drum 1 and the developing roller 4 are separated from each other, and the rotation of the developing roller 4 is stopped. In this state, at a speed slower than a speed during normal image formation, the pre-exposure sequence is performed at a laser light quantity similar to the laser light quantity during the normal image formation. By this, occurrences of the negative ghost and the exposure non-uniformity can be suppressed. Further, the influence of the execution of the pre-exposure sequence on the photosensitive member and the developing device can be minimized.

As described above, according to the third embodiment, while suppressing the generation of the negative ghost due to the photosensitive member, a lifetime of the developing device can also be maintained with a high image quality.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-211519 filed on Dec. 14, 2023, which is hereby incorporated by reference herein in its entirety.

What is claimed is:

1. An image forming apparatus comprising:

a photosensitive drum;

an exposure unit configured to form an electrostatic latent image on the photosensitive drum by exposing the photosensitive drum to light;

a developing unit including a developer carrying member for carrying a developer and configured to develop the electrostatic latent image by supplying the developer by the developer carrying member and to form a developer image;

a transfer member configured to transfer the developer image;

a development separation unit configured to enable a first contact state in which the photosensitive drum and the developer carrying member are in contact with each other and a first separation state in which the photosensitive drum and the developer carrying member are separated from each other;

a transfer separation unit configured to enable a second contact state in which the photosensitive drum and the transfer member are in contact with each other and a second separation state in which the photosensitive drum and the transfer member are separated from each other;

a storing portion configured to store information related to a thickness of the photosensitive drum; and a controller configured to control the exposure unit, the development separation unit, and the transfer separation unit, wherein before a present image forming operation is performed, the controller controls the transfer separation unit so as to put the photosensitive drum and the transfer member in the second separation state and controls the development separation unit so as to put the photosensitive drum and the developer carrying member in the first separation state, and then the controller controls so as to determine whether or not pre-exposure for exposing the photosensitive drum to light by the exposure unit is to be executed, depending on a standing time from an end of a last image forming operation to a start of the present image forming operation and on the information stored in the storing portion, and wherein the controller controls:

so that the pre exposure is executed in a case in which the standing time is a first predetermined time and the thickness of the photosensitive drum is less than a predetermined thickness, and so that the pre-exposure is not executed in a case in which the standing time is the first predetermined time and the thickness of the photosensitive drum is the predetermined thickness or more.

2. An image forming apparatus according to claim 1, wherein in a case in which the standing time is a second predetermined time or more, the second predetermined time being longer than the first predetermined time, the controller controls so as to execute the pre-exposure irrespective of the thickness of the photosensitive drum.

* * * * *